(12) United States Patent   (10) Patent No.: US 7,185,150 B1
Kogge                            (45) Date of Patent:     Feb. 27, 2007

(54) ARCHITECTURES FOR SELF-CONTAINED, MOBILE, MEMORY PROGRAMMING

(75) Inventor: Peter M. Kogge, Granger, IN (US)

(73) Assignee: University of Notre Dame du Lac, Notre Dame (IN)

( * ) Notice: Subject to any disclaimer, the term of this patent is extended or adjusted under 35 U.S.C. 154(b) by 481 days.

(21) Appl. No.: 10/665,263

(22) Filed: Sep. 22, 2003

Related U.S. Application Data

(60) Provisional application No. 60/411,888, filed on Sep. 20, 2002.

(51) Int. Cl.
*G06F 12/00* (2006.01)
*G06F 9/00* (2006.01)

(52) U.S. Cl. ............... 711/147; 711/100; 711/154; 712/228

(58) Field of Classification Search ............ 711/147, 711/154, 100; 709/201, 216, 217, 218; 712/228, 712/229
See application file for complete search history.

(56) References Cited

U.S. PATENT DOCUMENTS 6,266,745 B1 * 7/2001 de Backer et al. ......... 711/147
6,343,346 B1 * 1/2002 Olnowich .................. 711/142

OTHER PUBLICATIONS

Sterling et al., Gilgamesh: A Multithreaded Processor-In-Memory Architecture for Petaflops Computing, IEEE, 2000.*
Kogge et al., Implications of a PIM Architectural Model for MPI, CLuster2003 Convention, Dec. 2003.*
Holmes et al., Processing in Memory: The Terasys Massively Parallel PIM Array, IEEE 1995.*

* cited by examiner

*Primary Examiner*—Kimberly McLean-Mayo
(74) *Attorney, Agent, or Firm*—Michael G. Verga

(57) ABSTRACT

A computer system comprising: a plurality of memories each containing one or more locations; and a first threadlet for causing a first program to run in the computer system when at least one first memory location of the plurality of memory locations is local to the threadlet. Also provided is a method allowing such a threadlet to move itself to memories that include some specified second memory location.

38 Claims, 4 Drawing Sheets

PARCEL FORMAT

FIG. 3

| | A | D | R | F,S,PC | C[4]...C[15] |
|---|---|---|---|---|---|
| W[0] | E[0] | E[1] | E[2] | | E[3] |
| W[1] | E[4] | E[5] | E[6] | | E[7] |
| W[2] | E[8] | E[9] | E[10] | | E[11] |
| W[3] | E[12] | E[13] | E[14] | | E[15] |
| W[4] | E[16] | E[17] | E[18] | | E[19] |
| W[5] | E[20] | E[21] | E[22] | | E[23] |
| W[6] | E[24] | E[25] | E[26] | | E[27] |
| W[7] | E[28] | E[29] | E[30] | | E[31] |

E[i] contains C[16+16i] through C[31+16i]
U is made up of W[0] through W[7]

☐ Present only in extended formats
▓ Present only in 2304 bit formats

FIG. 4

1A: | Opcode |

2A: | Opcode | r | d |

2B: | Opcode | Opextension |

2C: | Opcode | BranchDisp |

3A: | Opcode | Opex | Reg Spec |

3B: | Opcode | Opextension | BranchDisp |

4A: | Opcode | Opex | Reg Spec | BranchDisp |

ARCHITECTURES FOR SELF-CONTAINED, MOBILE, MEMORY PROGRAMMING

CROSS-REFERENCE TO RELATED APPLICATIONS

The present application claims priority from U.S. Provisional Patent Application Ser. No. 60/411,888, entitled "Architectures for Self-Contained, Mobile, Memory Programming," filed Sep. 20, 2002, the entire disclosure and contents of which is hereby incorporated by reference.

BACKGROUND OF THE INVENTION

1. Field of the Invention

The present invention relates generally to computer system architectures.

2. Description of the Prior Art

In most modern massively parallel computer systems, with a number of CPUs and memories, such as in the ASCI class systems, one finds typical efficiencies (percent of total possible computation that are actually useful) of only a few percent. A typical cause of the inefficiencies in conventional computer system architectures is that in these architectures the nodes in the system that perform the computation are often unable to efficiently "do something" with variables in remote memories, because of the large distances between them.

SUMMARY OF THE INVENTION

It is therefore an object of the present invention to provide computer system architecture that provides increased efficiencies as compared to conventional computer system architectures.

It is another object of the present invention to provide an improved computer system architecture that is highly compatible with "conventional" architectures and systems.

According to a first broad aspect of the present invention, there is provided a computer system comprising: at least one first node having at least one first memory; and a first threadlet for causing a first program to run in the computer system when the at least one first memory is local to the first threadlet.

According to second broad aspect of the invention, there is provided a method comprising the steps of: providing a first threadlet for causing a first program to run in a computer system when at least one first memory of at least one first node of the computer system is local to the first threadlet; and the first threadlet executing the first program in the first node.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 3 illustrates a preferred embodiment for a parcel format of the present invention in tabular form;

FIG. 4 illustrates instruction formats of a preferred embodiment of the PIGLET architecture of the present invention;

DETAILED DESCRIPTION OF THE PREFERRED EMBODIMENT

Figure 1:
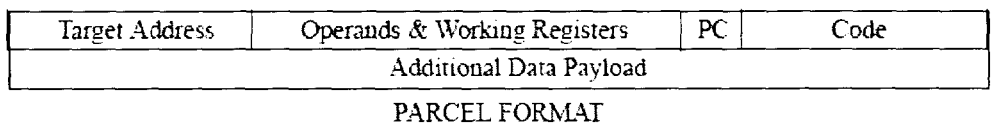
FIG. 1 is an illustration in schematic form of a system architecture of a preferred embodiment of the present invention.
Figure 1:
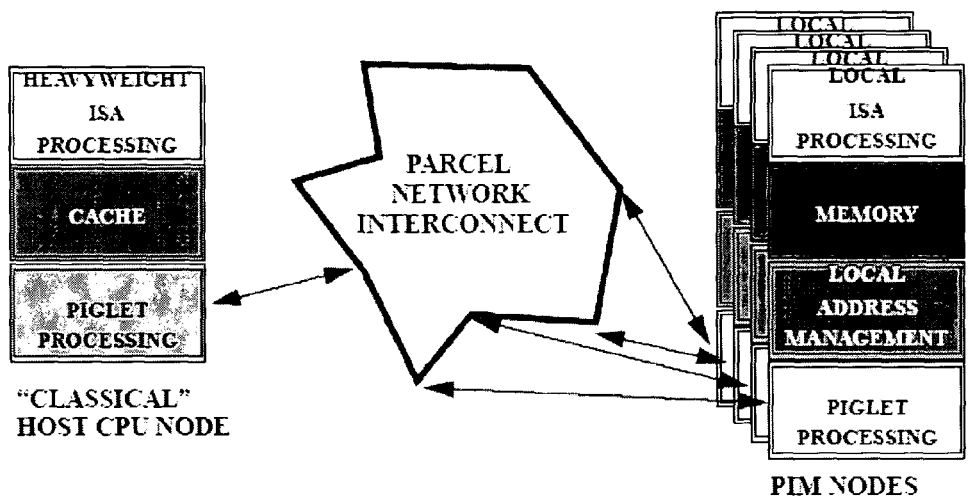

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "computer system" refers to any type of computer system that implements programs including an individual computer such as a personal computer, mainframe computer, minicomputer, etc. or a network of computers, such as a network of computers in a business, the Internet, a supercomputer, personal data assistant, cell phone, etc. A computer system encompasses any device that includes at least one processor and one or more memories.

For the purposes of the present invention, the term "host" refers to a classical CPU.

For the purposes of the present invention, the term "PIGLETs" refers to parcel-hosted ISAs for governing locally executed threadlets.

For the purposes of the present invention, the term "thread" refers to an ordered sequence of related operations to be conducted in a computer system consisting of CPUs, memories, etc.

For the purposes of the present invention, the term "threadlet" refers to a thread that is aware of when the thread is local to an accessible memory location. In a preferred embodiment, a threadlet is able to specify one or more accessible memory locations when the threadlet is not local to those accessible memory locations. A threadlet may be viewed as the combined code, working registers, and program state that represents a basic unit of execution in a PIGLET architecture. In general a threadlet is a short sequence of operations and a very small set of working storage that are performed at a particular memory and represents some short sequence of actions that are to be performed against some very specific memory locations in that memory, and which if executed in a conventional design would represent a long latency event. A simple example of a threadlet might be an "op to memory" such as a test-and-set, compare-and-swap, or even a floating point sum to memory. More complex, but still relatively short threadlets might be constructed to perform some basic linked list functions, search a tree, gather or scatter data arranged in sparse formats, or initiate block transfers. Even more sophisticated operations might involve starting new threads of execution at a memory node that in turn represent either a more heavy weight thread or something akin to a method invocation. On the other "simpler" side, a threadlet should also be capable of performing the very basic memory operations expected of a memory system, such as reads and writes.

For the purposes of the present invention, the term "accessible memory location" refers to a memory location that the thread is capable of accessing from a memory.

For the purposes of the present invention, the term "aware" refers to the ability of a thread to determine where the thread is with respect to one or more memory locations.

For the purposes of the present invention, the term "specify" refers to a thread including means for determining which memory locations will be accessible memory locations.

For the purposes of the present invention, the term "parcel" refers to PArallel Communication ELement and is the packet of information that contains all the information needed to execute a threadlet. A parcel may be used to move a suspended threadlet from one memory to another.

For the purposes of the present invention, the term "state of a thread" refers to the set of that basic information, exclusive of memory variables, that a thread needs to reference in order to execute its instructions, such as its program counter, basic data registers, condition codes, execution privileges, etc.

For the purposes of the present invention, the term "communication element" refers to a packet of information that sent by a source to a destination, and when the packet has arrived at the destination, is capable of indicating to the destination the operations desired by the source.

For the purposes of the present invention, the term "suspended threadlet" refers to a threadlet that has at least temporarily stopped running a program.

For the purposes of the present invention, the term "full word" refers to a group of bits of data, potentially several thousand bits, in one or more memories that is retrieved by the memory when it is commanded to perform a memory operation.

For the purposes of the present invention, the term ""wide word" refers to a group of bits, potentially several hundred bits, of a full word that a memory can actually make available to surrounding logic at one time.

For purposes of the present invention, the term "node" refers to a memory with a set of associated processing logic. A node is a combination of a memory unit and some processing logic, akin to a CPU, that is capable of executing programs.

For the purposes of the present invention, the term "PIM node" refers to part of a chip implemented from "Processing in Memory" logic including at least one memory macro and a set of processing logic.

For the purposes of the present invention, the term "PIM Lite architecture" refers to the architecture of a particular PIM chip is described in Brockman et al., "PIM Lite: On the towards relentless multi-threading in massively parallel systems" in University of Notre Dame CSE Department Technical Report TR03-01 (Feb. 17, 2003), the entire contents and disclosures of which are hereby incorporated by reference For the purposes of the present invention, the term "communications network" refers to the hardware and software that may interconnect multiple sources and destinations, and permit communication elements to be transferred between the sources and destinations.

For the purposes of the present invention, a memory location is "local" to a thread if when the thread performs an access to a memory location, the thread can perform a read operation of requested data at the memory location in as direct a fashion as possible, that is there is no other place where the thread could be executing where the access would be more direct. Depending on the embodiment of the present invention, when a threadlet accesses a local memory location, the threadlet may run a program stored at that memory location or use the memory at the memory location as data as the threadlet runs a program that is part of the threadlet.

For the purpose of the present invention, the term "state of a threadlet" is the same as that for the state of a thread, with such state storable in a parcel. A "visible state" is any piece of information from the state that will affect the way the threadlet behaves or computes while running a program.

For the purposes of the present invention, the term "ensuring arrival" of a parcel refers to a computer system where a threadlet can verify that it in fact has resumed execution after being moved in a parcel at some processing logic that is in fact local to the memory holding a specified memory location.

For the purposes of the present invention, the term "unpacking" of a threadlet refers to allowing the threadlet state packaged in a parcel to be placed into the processing logic local to some memory in a way that allows continued execution of the threadlet's program.

For the purposes of the present invention, the term "memory operation" refers to the accessing of a memory in some way, such as reading some specified data from it, or writing data to it.

For the purposes of the present invention, the term "memory macro" refers to the smallest amount of electronics, typically implemented as part of a larger chip, that makes up a fully functional memory unit, capable of performing memory operations. It is expected that on a typical PIM chip there will be multiple nodes implemented, with the memory unit for each node implemented from one or more memory macros.

For the purposes of the present invention, the term "latency" refers to the time required for a request for a memory operation to be sent from a source processing logic to some destination memory, have the specified memory operation to be performed at the memory, and for the response (if any) from that operation to be transmitted back to the source. This period may be measured either in units of time such as seconds, or in terms of the number of machine cycles (or clock periods), during which the source is waiting for the operation to be performed and/or the response to arrive.

For the purposes of the present invention, the term "ISA." or Instruction Set Architecture." refers to the design and specification of the individual instructions that make Up a program, and that are interpreted and executed by some set of processing logic, such as a CPU.

For the purposes of the present invention, the term "heavy weight computation" refers to an ISA and associated processing logic of comparatively conventional design (such as found in modern PCs), where there may be a significant amount of thread state in the ISA, and to support good performance, there are typically many levels of cache or other techniques to accelerate the apparent latency of memory references.

For the purposes of the present invention, the term "ASCI class computers" refers to the very large parallel computers constructed from up to thousands of CPUs and memories typically used for large scale computations, such as developed by the Accelerated Strategic Computing Initiative (ASCI) program from the U.S. government's Department of Energy.

For the purposes of the present invention, the term "multithreading" refers to the ability of processing logic to execute two or more separate threads concurrently.

DESCRIPTION

The present invention provides a new kind of system architecture for a computer system, one that allows the construction of short programs to be placed in what normally would be a simple read/write packet being sent by a CPU to a memory. These programs represent relatively short program threads that perform some very specific and localized memory activity. Such programs, if executed "at the memory" would convert many operations that are normally very two-way latency-involved into one way memory access requests. Also, if designed properly, the architecture of the present invention should reduce the network traffic on the interconnect fabric between sites of computation and sites of memory. Together, these two improvements both attack the now infamous "memory wall."

One thing that distinguishes the present invention from conventional approaches is that at the very core of their design, the present invention employs threads that are "built to move," logically from one object to another, physically from one memory chip to another. By embedding the concept of movement into the ISA (Instruction Set Architecture), the present invention is capable of successfully attack the memory wall. Such architecture, illustrated in FIG. 1, is clearly a good match for Processing-In-Memory (PIM) technology, where processing logic capable of executing such programs can be placed on a memory chip, next to a memory macro. Such an architecture is also a good match for massively parallel systems, where there are huge numbers of such PIM-enhanced memory chips, which may also include large numbers of "conventional" CPUs embedded throughout the memory, and where time-of-flight latency alone can run into the hundreds of nanoseconds.

The threadlets of the present invention have capabilities that unifies a wide range of computational and memory access activities, especially when the distances between sites of heavy weight computation and sites of main memory storage are so large as to degrade significantly the efficiency of the heavy weight sites. If one looks at most modern massively parallel systems, such as in the ASCI class, one finds typical efficiencies of a few percent, with the bulk of the problem lying in the inability of one node to efficiently "do something" with some variable in a remote memory. The goal of a PIGLET-enhanced system of the present invention is thus to increase these efficiencies significantly, and in ways that are still highly compatible with "conventional" architectures and systems. As a trivial example, consider the following notional code sequence to implement a floating point "add value Y to memory location X." If one looks at this on a conventional computer, if memory location X is not local to the logic executing the program, then at least two high-latency events are needed: the round trip to request the original value of X and return a copy, and the round trip to write the new result back to X and return a response indicating successful completion. If there are multiple threads that might concurrently be attempting to do the same thing to X, then even more code, and more high latency events may be needed to protect location X so that the updates get done one at a time.

On a PIGLET system, the codes do the update, and the working registers holding the address of X and the address/value of Y are assumed to be part of the parcel, and are sent to the processing logic most local to the location X. Here the threadlet state is made active, and a threadlet program looking something like the following is executed.

LOAD X; retrieve X into a threadlet register
FADD Y; perform sum, where Y is a threadlet reg
STORE X; return the modified value
QUIT; end the threadlet These four instructions would be packaged along with the address X and value Y, and shipped to the memory macro holding X. In some of the architectures discussed below, some variations of this code will enhance robustness, especially in large systems, but in a preferred embodiment still typically consumes less than 32 bits of code space.

Preferably, the system architectures of the present invention: 1. scale effectively into extremely large memory spaces, where memory is scattered over a potentially huge number of physical chips; 2. work correctly, even in the presence of huge numbers of concurrently executing threadlets; 3. are capable of dealing directly with embedded addresses, and 4. work correctly regardless of where memory called out by such addresses is physically located.

A PIGLET processor of the present invention is preferably extremely cheap to implement, compatible with dense DRAM technology limitations, and yet still runs fast enough to warrant the migration of function from the conventional heavy weight computational site to the memory. A preferred PIGLET program fits within the approximate confines of what would have been a classical memory reference packet and is largely independent of the underlying memory management techniques and the exception handling procedures present in a system, allowing it a fair degree of portability between different system designs. Preferably, there are hooks in the PIGLET architectures that permits efficient communication between threadlets and other computational threads, again without a PIGLET architecture or program having to be changed to reflect these other architectures.

As representative numbers, a petaflop system, such as defined by the HTMT project (see Peter M. Kogge & PIM Development Group, "PIM Technology Projections for the HTMT Project, Version 2," Univ. of Notre Dame, CSE Dept. Tech. Report TR99-15, Sep. 13, 1999 and Peter M. Kogge & PIM Development Group, "Final Report: PIM Architecture Design and Supporting Trade Studies for the HTMT Project," Univ. of Notre Dame, CSE Dept. Tech. Report TR99-16, Sep. 13, 1999, the entire contents and disclosures of which are hereby incorporated by reference), may have 32 TB of DRAM PIM memory, implemented by upwards of 32K PIM DRAM chips, with each chip having on the order of 32 internal nodes (memory macro+local processing). This clearly requires memory addresses in excess of 32 bits, and involves potentially over a million sites of execution within the memory alone. Within a DRAM memory macro a single memory request may actually access several thousand bits (a full word), of which several hundred (a wide word) may be presented directly to the local logic. Typically a full word and wide word in today's technology are about 2048 and 256 bits, respectively. When a full word is 2048 bits and wide word is 256 bits, the lower limit to which sequential memory addresses can be "striped" across multiple macros (or chips) is on the order of about 256 bit increments. With the above-described constraints on full words and wide words, the largest consecutive sequence of addresses that may be mapped to a single node is somewhere in the 8 MB to 32 MB range. Such a system requires a large amount of "virtualization" of addresses, with dynamic remapping an integral feature. Simple reliability concerns dictate this: even if a single memory macro has a MTBF ("Mean Time Between Failures") of say a million hours, a million of them in a system may have failure rates on the order of one an hour. Each PIM node (memory macro+logic) supports additional computational facilities beyond PIGLET processing, such as described by the PIM Lite architecture. Program threads running on these nodes are independent of the threadlets that may arrive from outside the node, and in fact will probably be written in a slightly richer ISA, capable of more extensive computation. Multiple independent applications may be present in such a system at the same time, implying that there may be more than one "virtual address space" to be managed by the system concurrently.

The minimal sized memory request packet for a system of the present invention as described above would be on the order of a few hundred bits (consider a WRITE with a 64 bit address, 64 bits of data, and associated command, byte-enables, etc.). Real systems may have much longer packet sizes, up to several thousand bits to reflect larger cache lines, or to take advantage of efficiencies in the underlying network transmission protocol.

PIGLET programs of the present invention are able deal very frequently with embedded addresses, where these addresses are in a virtual space associated with some particular application. When a PIGLET program encounters such an address, it will be virtual, not physical, and thus could be anywhere in the (physical) memory. A key concept behind PIGLET is that when an address for some object to be accessed by the threadlet is encountered, the threadlet can ensure that it is physically moved to a computation site close to the addressed location.

In a preferred embodiment of the present invention, included is a method of ensuring that a threadlet is moved to a computation site local to a particular memory location. This involves several steps: 1. determining whether or not the specified address is already local, 2. if not local, determining where the target memory location is in the system (in terms of routing through the interconnection network), 3. saving the state of the threadlet, including code, in a parcel, 4. injecting the parcel into the communication network, 5. ensuring at arrival that the parcel is now at the correct memory node, 6. unpacking and restarting the threadlet where it left off, and 7. performing the requested memory operation. Preferably, all of the steps are defined in a fashion that is compatible with a wide range of underlying implementation technologies, from totally hardware supported, through a mix of hardware and PIM node-resident software, to totally PIM node-resident software support. A complicating factor is that the information needed to translate an address that is part of a potentially petabyte-scale address space into a physical node of at most 32 MB requires more information than can rationally be kept on each node, or that can be kept coherent over potentially millions of nodes. Therefore, in a preferred embodiment, each node, at a minimum, is capable of determining independently step 1 above, that is whether or not an address is "local" or not.

When a thread accesses an address that is non-local, then some more complex processes may be necessary than as described above. One approach to relay such locality information to a threadlet is to simply allow an exception to occur when a memory access is attempted and it is not local, and then allow some exception handling routine to handle this. Several other approaches may at least provide the program with direct information as to the results of the translation process applied to the effective address. Three other ways of relaying locality information include a separate "Pretest" instruction to determine if an address is 'local' or not, a condition code returned on each load that signifies whether it succeeded or not, and a "Load and Skip" which skips the next instruction if the load succeeded locally.

In a more preferred embodiment of the present invention, a threadlet is given limited but explicit knowledge of a variable's physical location, and the ability to signify when and where the threadlet wants to move. The central idea is to include in a PIGLET ISA an instruction termed a "move instruction," which moves the threadlet not data. A move instruction is provided with an address as the sole operand of the instruction, and has the semantics that after the move instruction has successfully completed (and this requires a careful definition of "successful"), the location addressed by the address operand is guaranteed to be local. Nothing else in the threadlet's visible state is changed by the move. Such an explicit instruction permits a wide range of simple implementations. When executed, the move takes the address provided, and performs the local address translation. If the result is that the address is in fact local, execution continues (an optimization might copy the translated address into a shadow register to simplify later memory operations). If the address is not local, any combination of hardware and support software (as long as it is invisible to the threadlet) can be used to determine the target node, develop the routing information, and move the threadlet. When the threadlet is re-established at a new node, re-executing the move can verify that in fact the threadlet is at the right spot. Such a re-check provides for robustness against inaccurate or old translation information that might be cached locally in a node. This mechanism now simplifies any further "classical" memory access instructions in the architecture. If they use the same address used in the move, and the translation information has been kept, then the access can be performed directly, without further complication. If the memory access instructions use other addresses, the address translation mechanism can simply expect fault if the address is not local (and/or is not compatible with the address translated by the move). This allows a threadlet code generator that has explicit knowledge about memory locality to greatly simplify the execution time requirements of the PIGLET processing hardware.

One of the key advantages of PIGLET-class architectures of the present invention is that they allow those atomic memory operations (such as test-and-set) that so bedevil hardware designers, and cost so much execution time on conventional cache-based systems, to be performed much more efficiently "at the memory." Furthermore, PIGLET-class architectures are capable of expanding the range of such operations beyond the handful of simple operations typically provided. The sample sequence described earlier is a simple indication of how that could be done with minimal coding. In a real PIM system, such a sequence ought execute easily in under 50 nanoseconds once the parcel arrives at the correct node.

On a conventional system, a LOAD-ADD-STORE might consume literally hundreds of nanoseconds if the target word is far away from the CPU doing the adding. The PIM version is an obvious improvement, but is not really a complete comparison. On conventional systems, especially in SMPs ("Shared Memory Processors"), the time taken is so long that it is very conceivable that two identical sequences could be executed by two different CPUs at the same time. Depending on relative timing, the final answer may or may not be correct (the second thread may slip its LOAD in between the first thread's LOAD and STORE). The effect of one of the adds thus may not be seen on the memory value. In a PIM system, even though the time scale is much shorter, it is still possible that two such threadlets would interact over the same variable. This might be especially true in a PIM architecture that is already inherently multi-threaded at both the architecture and microarchitecture level, as is PIM Lite. The solution employed in conventional systems is to "lock out" to some degree the memory from other references while such a sequence is going on.

There are several such mechanisms that have been discussed in the literature for such a "lock-out": 1. Include a special LOAD that physically locks out the memory bus (other than for instruction fetches) until a succeeding STORE. This has problems with interruptability, especially if there is something like a page fault on the Load address. 2. Encapsulate the entire sequence in a single instruction such as a COMPARE&SWAP, TEST&SET, LOAD&CLEAR, etc. where a load, compute, store is done with the bus locked out from other users. Some ISAs such as Intel's x86 family of microprocessors allow prefixes for any instruction that have the same effect. This avoids the interruptability problems, but becomes more complicated if the referenced value is cached either locally or in some distant cache. Finally, it also does not scale well to very large parallel systems where there is no "bus," and the memories are numerous and quite a distance from the CPUs. 3. Variations of the above two, but with just operations against that address (or addresses within some specified range such as a cache line) locked out. This requires the equivalent of additional forms of "snooping" on each CPU connected to the memory bus. For network vs. bus interconnected systems, it requires the "lockout" addresses be stored at the memory modules, complicating their design. 4. A reservation system is implemented where a special "LOAD & RESERVE" command will load from a specified address, and make a marking for some chunk of storage surrounding that address indicating that CPU has reserved the memory in the chunk. A second new instruction, a "STORE & CLEAR RESERVATION" will perform a normal store only if that block of storage still records that a reservation is in effect against that chunk by the same CPU making the store. If the proper reservation is not standing, then the store does not complete. In either case a condition code is set that indicates if the store completed. Successful completion of the store will remove the reservation. So will access from other threads or CPUs. A conditional branch following such a load/store duo can determine if the sequence was atomic or not. If not, the program can repeat the process in a polled manner until the request goes through. The POWERPC™ implements such a technique. This reservation approach also avoids any sort of bus interlock, and thus scales better. However, it does require "reservation logic" somewhere near the memory to record potential reservation on each chunk. It also still involves some complex semantics to deal with cached data, and requires polling loops to wait for the operation to complete successfully. Finally, it requires at least two full round trips per iteration (the store must respond back to the CPU with a success or failure indication). These extra trips also consume more interconnect bandwidth and time.

In another alternative, "Full/Empty" bits can be added to each word in memory. Changes to the Load will then detect if the extra bit for the targeted location was set to Full when the load occurred (and perhaps record the result in a condition code) and reset the bit atomically to empty. Changes to the Store will then set the bit back to full, often with the store failing as in the prior case if the bit was not Empty when the store data arrived (and again setting the condition code). This technique has the very significant advantage of a set of easily understood and predictable semantics to go with it, but does require extra bits on each memory word which are toggled "atomically" on loads and stores. Such toggling may also complicate the computation of parity or ECC data on the memory. In addition, to avoid polling on an empty location, some hardware implementations will suspend the memory requests that find the word empty, and queue them up with the head of the queue in the body of the word being modified. When a store arrives, the head request in the queue is given the store data, the word left empty, and the next item in the queue promoted to the new pending entry.

There is additional latency and bandwidth utilization due to the extra signaling in any of these. As mentioned above, the execution of a threadlet very close to the memory makes it less sensitive to the above problems caused by interleaved threads. However, less is not zero. Further, given that a mechanism that is employed at one memory macro is totally invisible to that at another makes any of the above solutions for a PIM-based PIGLET implementation much more scalable. In terms of implementation comments, either the "lock out" or the "reservation" style mechanism is relatively easy to implement on a simple PIM node, albeit the former may have some disruptive effects on SMT-style (Simultaneous Multi-Threading) pipelining of multiple concurrent threads and threadlets on the node. Finally, the "full/empty" protocol is one that is ideal for implementation as a threadlet itself, especially the queue management. Thus, a good choice for a PIGLET architecture may be a simple "Load with reservation," and "Store, release, and branch if reservation failure," coupled with instructions to test, set, and reset tag bits in the memory. The program resident in the threadlet can perform the loop directly. The reservation mechanism can be implemented as either a local bus lock, or a true reservation. In the former case, the store will never branch on a reservation failure. In any case, the times involves in the various tests are a few nanoseconds at best, and not the hundreds of nanoseconds needed to access a remote memory as in a conventional parallel system.

The most basic of all memory operations is a simple load, access a specified operand and return the value to some other location, usually a CPU register or a cache entry. If the return location is in fact a memory location somewhere, the threadlet program becomes fairly simple: move to the memory that contains the data to be accessed, read the data word into the threadlet state, move to the memory representing the target, store the data from the threadlet, and quit. Such a threadlet requires two operands at the time it is launched: the address to be read and the address to receive the data. In a real sense the second operand, and the code that goes with it, is an example of a "continuation." A parcel is launched to perform some function at a memory. Once that operation completes, the continuation associated with the state of the thread needs be restarted, and processing continued somewhere else. The concept of a move handles this very nicely.

Handling a final target that is a CPU register can be a simple modification of this PIGLET program—simply give each CPU register an alias within the application's virtual address space. This does require a PIGLET interpreter on the chip that contains the CPU, with an interconnection network that recognizes the CPU registers as within a "memory space." One complication that comes into play here, however, is symptomatic of many other applications of PIGLET programs. After completion the final store, a waiting thread (or threadlet), other than the active threadlet, may need to be notified that the data has arrived, and the threadlet completed its assigned task. In the case of a CPU register, such notification may be a hardwired function that is triggered by the store process, just as implemented today when a cache miss completes with the arrival of data from memory. A variation of this would be to include in the PIGLET architecture the ability to generate a discrete signal, much like an interrupt signal, where the effect of the signal is determined by the implementation on the other side of the signaling interface. Neither mechanism, however, scales well to cases of large numbers of potential suspended threads or threadlets in PIM Lite-like architectures. A variation that does, however, is to include in PIGLET an instruction that uses an operand as an address of a thread state to be reactivated at the target node. The actual execution effects of such an instruction could be implementation dependent. In one version, the address is provided to a hardware thread scheduling mechanism. In another implementation, the instruction could fetch the indicated wide word, and present that directly to the hardware for execution. In either case a testable condition can be set that can then be used by the threadlet to verify that the desired effect had been achieved. A variation of this mechanism could terminate the current threadlet, and reload its execution resources with the new one. A natural complement to this mechanism is a PIGLET instruction to suspend the current threadlet by saving its state in a designated memory location, and freeing up execution resources.

As classical superscalar architectures have developed, models of memory consistency (with respect to the ordering of multiple loads and stores) have become less and less "guaranteed." The most current models, such as the Alpha, now support relatively relaxed models where memory accesses may be issued in program order, but there is no guarantee that the actual order of execution is the same. Special instructions create "barriers" in time at which the program is guaranteed that all prior operations (reads, stores, or mixes) have completed, before future memory operations are permitted. This makes some guarantees at the source, but not at the destination. As parallel systems get larger and larger, and variations in network paths get larger and larger, such guarantees get weaker and weaker.

Threadlets can help this situation in at least two ways. First, if it is crucial that operations be done in order at the destination location, and some extra storage can be allocated for ordering control, a "sequence number" can be appended to each parcel as an operand. Then, as parcels arrive at the destination, their threadlet programs can determine if they are in fact the next operation. If so, they execute the operation. If not, they can perform some sort of operation to delay or suspend themselves until the missing operands have arrived. This implies some comparison capability in a PIGLET ISA, plus the ability to suspend/restart threadlets much as described above.

A second aid may be on the source side. After performing a designated memory operation, a threadlet could be programmed to return to the source of the parcel, and signal that the threadlet had successfully completed the threadlet's execution. This can be via one of several ways: a counter associated with a barrier instruction (as discussed above) could be modified, or a bit set/reset based on a sequence number provided by the original access request. In either case, the resulting register value can be tested by a barrier instruction in the host CPU for an indication of pending activity. A source for the latter might be from the relative position of the original request from a load/store queue, or its relative position in the program. As an example of the latter, the Cray Inc. MTA™ ISA specifies a number which represents the maximum number of pending memory accesses that may be left outstanding for a particular thread before that thread must stall. The number of the access within this window could be the source of such a number.

Finally, in systems that support coherent caches, it may also be reasonable to consider allowing threadlets to perform the coherency protocols directly, since they are traversing between memories anyway. If a threadlet is to be the carrier of a cache line, then it must be able to be executed at the edge of a cache. If this is the case, then adding some additional capabilities to test and modify flags associated with individual memory words (as was suggested for the full/empty bits discussed above) would provide such a capability relatively cleanly. Note that this latter capability opens up all sorts of potential applications where scavenging caches from outside a CPU may provide for some significant additional capabilities.

The present invention also supports multithreading at the threadlet level, with new thread(lets)s being generated by threadlets themselves from internal data, and from thread states stored in memory. In terms of design characteristics, to allow for multithreading, the PIGLET architecture of the present invention preferably has a number of characteristics: At minimum, a threadlet in the architecture needs no explicitly allocated memory to run, can spawn additional threadlets from basic PIGLET instructions, and can easily verify that the spawning was successful. Threadlet state size is preferably compatible with basic memory characteristics, so that when a threadlet is to be suspended to, or restarted from, memory, the complete state access takes a minimum of memory macro operations. When restarting a thread state saved in memory, a threadlet need only know the address of the memory location holding the state, and not what type of thread is being restarted (mobile threadlet or thread pinned to the current node). This latter distinction must be handled by the local node processing logic; however, something visible in a thread state storage (i.e. a bit at least) ought distinguish between threadlets and native host threads. Since threadlets are preferably anonymous, threadlet synchronization, or synchronization with non-PIGLET threads should be through named memory locations, using short sequences of PIGLET code much as discussed above. No special PIGLET instructions need be provided. There are preferably mechanisms to transfer data from the current threadlet's working registers to places in a threadlet-to-be for its arguments.

One problem surfaces where a threadlet reaches some node, and for some reason must suspend itself. In such cases, either the threadlet preferably will somehow signal a host processor, that then must read the threadlet state and save it in memory, while at the same time placing the address of the location where the state is stored wherever it is needed so that it can be restarted. This is not only slow and complex, but generally requires some local intelligence at the memory node.

An alternative embodiment of the present invention employs a "virtual mapping" mechanism as described above. Furthermore, in an embodiment of the present invention that employs a virtual mapping mechanism, preferably each memory node is allowed to keep at least one page (where "page" is used in the classical sense) of local memory that is mapped into a single common page of virtual memory. Thus, at every memory node there is a deliberate aliased copy for this page of virtual memory that is totally local. Any threadlet that asks the question "Is a virtual address in that page local?" will get a true result. At application initialization, part of this aliased block is initialized into a linked list of blocks, where each block will contain a complete parcel of maximum size. A single word at some known location in this aliased page will point to the beginning of the list. Now, threadlets can access this free list to reserve a block of storage for saving their state. Given that they know the address of the block, they can then leave this address in other local storage so that other threadlets can restart them, again with purely local accesses.

In one preferred embodiment of the present invention, PIGLETs alone do not make up the entire processing power of a large system. For example, more powerful ISAs may be expected within any PIM node (such as described by PIM Lite), plus there may very well be very high performance processors of more classical designs sprinkled through the system. Given this, there clearly must be some way for communication between programs running in these various architectures to happen. The first type of such communication is generation of a memory access request by a classical processor. A preferred way to handle such a communication is to simply hardwire the translation from such a request into a parcel with the correct threadlet code.

For more complex requests, it may be appropriate to allow assembly of a parcel in local storage (a cache line by a classical CPU or a wide word by a PIM Lite ISA), followed by a single instruction that signals the launch of a parcel whose contents are at this local address. Such a launch is probably syntactically synonymous with a thread spawn, and ought be treated as such within the design of these other ISAs. Communication from a threadlet to some other thread in another ISA is already handled to some extent by a threadlet's ability to modify memory, as discussed above. If, however, in order to avoid polling loops by programs in these other ISAs on memory locations, there is preferably a mechanism to allow some sort of signal to be sent.

There are at least two such mechanisms that may be used with a PIGLET architecture. First is a variant of the threadlet spawning mechanism discussed in the prior section. There is no reason why the type of thread spawned by a threadlet instruction must be another threadlet. If the thread state is assumed to be in memory, then some initial bits in the thread state can distinguish between PIGLET and non-PIGLET threads. The hardware thread spawning logic in the PIGLET processor can use these bits to either handle the spawning directly itself, or pass the data onto the local host processor for interpretation by it. The second approach is simply to generate a signal to be interpreted by the local processor in any way that it so deems, as an interrupt or as a discrete signal to be tested. If such a mechanism is included, there should be the capability of selecting from one of several different such signals from within the threadlet. A variation of this might be as the rough equivalent of a SVC (Supervisor service request). The current threadlet is assumed suspended, and in a state where the other processor can read, save, and restore the threadlet to operation, if so desired. In any case, there are preferably some mechanisms to allow communication of some additional data from the threadlet to the host processor.

Two key aspects of any architecture are what errors or exceptions are detected, and how are they reported. This is particularly important for PIGLET architectures since the threadlets they support may be executed in huge numbers, all over the system, and in fact may be the mechanism by which errors in general are reported by any processor anywhere in the system. At a top level, there are several classes of errors that might be detected by a PIGLET processor: transmission errors (e.g. parity or ECC detected errors, or inability to reach a prescribed node) in an arriving parcel that may negate the ability of the PIGLET processor to interpret the threadlet, memory addressing errors, as in attempting to modify an address in such a way that it changes the address space to which the threadlet is allowed to access, in trying to use an address that the threadlet program believes is local but is not, or violates the memory protection system established for the system (e.g. write into a write-protected memory), memory accessing errors, such as when a valid address is used by a threadlet to access a local memory, and the memory responds with an error condition, computational errors, such as an over or underflow on a "floating point add to memory," PIGLET ISA interpretation errors, such as undefined opcodes, referencing an argument not present in the current parcel (especially when multiple sizes of parcels are possible), or branching outside of the current parcel limits, data conditions that a threadlet programmer wishes to flag as problems.

Given the constraints and goals for a PIGLET architecture, it is irrational to expect that a threadlet carry with it sophisticated exception handling routines (i.e. a complete run-time). Also, it may be irrational to expect that a threadlet can expect to find on each and every node a set of PIGLET code routines to handle such situations. It is also bandwidth-inefficient to assume that each parcel would waste space for an address that contains a thread to start in case of an error (this might actually cause a cascade of problems if the node can't communicate with other nodes, or that address has been damaged somehow, or the problem is that there are no free resources to start an exception handling thread). For similar reasons, relying on a standard memory address that should be present on all nodes is also probably not optimal. It may also be the case that most parcels do not contain return routing information in them, which means there is no way to determine who "owned" or "initiated" the threadlet it contains. This may be particularly true after some threadlet has been involved in some complex indexed or link list chasing operation. Consequently, perhaps the most efficient solution is for a parcel that encounters a problem to simply record the condition, suspend execution, and signal (i.e. interrupt) the native host processor most closely attached to the current location. The architecture of that processor should allow the processor to read the parcel, look at the parcel's contents (including the status code), and decide what to do.

The usefulness of full/empty bits were discussed earlier. Various memory architectures, such as for MTA, have taken such capabilities one step further so as to provide multiple extra bits associated with each memory word. For MTA this includes such things as programmable trap bits and forwarding bits. In addition, the potential for using PIGLET execution logic on the edge of caches was mentioned above. With respect to the makeup of conventional caches, usually each entry has associated with it a variety of tag bits also: valid, dirty, etc. Adding in cache coherency protocols (e.g. MESI bits) expands this list. Consequently, strong consideration ought be given in PIGLET architectures for support for additional bits associated with memory words, where these bits may be implementation or application dependent, but where generic PIGLET instructions can access them, test them, and modify them.

Block transfers between memory areas are an essential part of modern systems, especially for I/O. The ability to program a threadlet to perform a simple memory to memory transfer loop is relatively straightforward: it simply reads from one location, moves to the destination, deposits the data, increment addresses and counts, and repeats until done. While such an approach removes the need for DMA channels (in fact there may now be an unlimited number of simultaneous DMA operations), there are a variety of significant enhancements that an appropriately designed PIGLET architecture could support. First, of course, might be the ability to move whole wide words or even complete full memory accesses in a single parcel. This requires larger parcel sizes, which could be either predesigned or (even better) be dynamically selected by the threadlet as the need arises. Surrounding this with simple PIGLET instructions to test addresses to determine address offsets versus natural memory boundaries would allow for dynamic programs that can start anywhere, move arbitrary lengths of data, and end anywhere. An observation that one could make of this process is that the "return path" of the threadlet from the destination back to the source is essentially wasted bandwidth and time. No information is carried or useful work done. Consequently, one alternative is to allow a threadlet to spawn another threadlet, while the first continues execution. In a DMA environment, this would allow a reader threadlet to park at a memory module, reading data as long as the addresses are to that module, and launching the data it has read into parcels that will carry the data to the appropriate destinations. Taking this one step further, a master threadlet could spawn a bunch of reader threadlets, ideally to different memory nodes, from which they can independently read and launch data threadlets. Again the ability of a threadlet to signal when it has completed is a useful capability.

Clearly there is a real trade-off in parcel size: the larger the parcel, the more opportunity for operands, the bigger the potential threadlet program, and the larger the data payload. However, with increasing size comes increased weight in terms of bandwidth requirements. Smaller parcels clearly minimize this bandwidth need, but at reduced threadlet capabilities. Given the numbers given previously for realistic memory systems, there are a few "sweet spots" in parcel size that are worth considering: 1) single wide word (At the small end, a parcel of 256 bits (32 bytes) is sufficient for many basic threadlet operations, and matches the width of a memory macro wide word. This would allow threadlet forks, suspends, and joins with exactly one memory reference from a local memory. At this size the PIGLET-0 architecture described below seems to permit programs of up about 12 instructions), 2) wide word+"cache line" (At 512 bits or 64 bytes there is enough payload for a complete wide word matching in length a typical cache line of 32 bytes, along with 32 bytes of threadlet code and arguments. The additional space may also be used for additional operands, threadlet code, or a combination of both), 3) full memory word (at 2048 bits or 256 bytes what a single memory access provides is matched up to into the sense amps of the memory macro. This also matches the thread state in memory of PIM Lite), 4) full memory word plus one wide word (At 2304 bits or 256+32 bytes the payload corresponds to a full memory access, and still provides a separate wide word for basic threadlet control).

As rich a model as multi-threading alone might be, if designed properly a PIGLET architecture may be able to support additional execution models. Several models are described below.

Message Passing Model. Message passing at its heart involves variations of two primitives: send and receive. The former packages up data from the sender's memory to be sent to another thread (usually a separate process in a separate CPU with a separate address space), and the latter indicates where in a thread's local memory such data should be put if data is received. One of each is needed to perform a data exchange. While implementing such functions on a large scale distributed shared memory machine with a common address space such as envisioned here may seem irrelevant, there may be good reasons for doing so for software compatibility reasons. As such, most of what has been discussed above is already suitable for implementation of message passing as a threadlet. Areas of memory on the receive side can host dual queues: one of open receives for which sends have not been matched yet, and one for sends that have arrived and not found matching receives. When a match occurs, the send threadlet will perform the memory transfer into the specified receiving buffer. This may require additional trips back to the sending buffer to retrieve more data, plus a final trip to indicate that the buffer is now complete, but that isn't much different from a smart block transfer as specified earlier. The major architectural consideration here is one of specifying potentially inter-memory space transfers.

In a classical message passing environment, each side has their own memory space, and only a send-receive pair can bridge the two. Up until now, there has been no discussion any needs for PIGLET to traverse memory spaces; in fact such mechanisms are fraught with complexities. One solution that avoids it might assume a single address space for all such processes, but with different higher order address bits to distinguish between different "address spaces." Threadlets could thus perform the inter-memory transfers without difficulty, but without further checking mechanisms, there is nothing that prevents a faulty, or malicious, threadlet launched by one process to directly modify anyone else's memory directly. Another solution would be to keep each process in a separate address space, and have some intermediate node performing the modifications on a threadlet to allow it to traverse between them. This is clearly a performance hit, and it is unclear what kind of a protocol at this intermediate node would truly enhance security anyway.

Map Function Model. The map function from functional languages, such as Lisp, has as its arguments two items: a description of a multi-component data structure, and a function (often an anonymous "lambda" description). The result of the function is a new data structure that matches the structure of the original, but where each component is the result of applying the argument function to the component of the original data structure. Variations accept more that one data structure and do element by element functional applications, modify the data structure in place, or provide return values that represent "reductions" of all elements of the data structure. Such a model has two components, a data structure traversal part, and a computational part. Both could clearly be done by a single specially designed threadlet program. However, enhanced capability and programmability may result if the data structure traversal portion of the code be separable from the computation, allowing libraries of each to be mixed and matched. This might be done by a PIGLET architecture in two ways. First, a data traversal threadlet could spawn a computation threadlet each time a data component is discovered. This requires nothing that hasn't been discussed so far, other than perhaps a parcel payload that contains a threadlet that can be addressed by the owning threadlet. Second, a threadlet-level procedure call and return mechanism would be a potential solution, allowing the traversal code to call the computation code, and then regain control. The former probably doesn't require any extra resources over what has been discussed so far; the latter has a lot of potential flexibility but needs a mechanism (and space in the parcel) to save and restore threadlet level PC values, which may get complex in a tightly packed parcel.

Object-Oriented Method Invocation Model. One of the most interesting PIM-enabled execution models is related to object-oriented approaches. In an object-oriented programming language, most accesses to any sort of non-trivial storage is through a call to a method associated with the class of an object. When an operation on an object is required, the appropriate method routine is executed, which in turn is the only code that accesses directly the components of the object (i.e. the memory locations). For any non-trivial objects it is likely that multiple memory accesses will be needed, and in many cases these objects are rarely in caches, meaning that there are long latencies involved. It becomes even worse in a multi-processor where multiple threads may be executing simultaneously. In such cases, the method codes may have to lock out individual objects during the access process to guarantee atomic updates to a complete object. This adds to the latency problems. If it is assumed that a PIM node holds one or more instantiations of objects of a certain class, then it makes sense to host the code associated with those objects on the node, and exporting the method invocations to the PIM node for execution there. In such cases, a one way transmission of the method name and the method arguments to the PIM node, followed by a one way return of method function value (if any), is all that is needed for the method. All the intermediate object accesses are low latency ones, and even if lock outs are needed, the duration of the lock out periods are greatly reduced. Implementation of these methods can thus be done in at least two ways with a PIGLET threadlet. The threadlet code itself could be the entire method code, in which case nothing more than what has been addressed above is needed. Alternatively, if more substantial executions are required, then a PIM local method invocation thread can be started up, with the method name passed in as one of the arguments. Again the mechanisms discussed above for communicating between ISAs may be all that is needed.

Linda Model. Linda™ is a parallel programming paradigm that involves a database of structured objects, plus a symmetric database of queries against such objects. When a query is made against the data database, if there is a match the data item is extracted. If there is no match, the query is added to the query database. Similarly, if a new datum is added to the database, a check is made against the stored queries. If there is a match, the query, and the thread that made it, is restarted. Only if there is no match is the data added as a new object. An additional Linda primitive works much like map above, applying an anonymous function to some matching entry. The actual pattern match for such a process is an ideal example of potential high speed "at the sense amps" processing as exemplified by PIM Lite, with specialized wide word operations as developed in RTAIS. It is probably beyond the complexity of what is desirable to package in a short parcel, but does at least expose the potential for including "wide word" operations in PIGLET. At the very least, the mechanisms described previously are sufficient for traversing memory macros until ones are found which may contain potential matches, initiating routines to perform the local searches, and then perhaps in performing the join required to deliver the match result.

There may be times during a threadlet's execution where some amount of additional storage would be useful for temporary variables, over and above what needs to move with a threadlet from node to node. Cases where this has been observed to date include having enough registers to swap operands around, or to do some simple wide word style local data movements. In general, it is not preferable to allocate the biggest possible parcel size to every parcel just to handle this problem. Preferably a threadlet, when it starts, does in fact have local register space equal to the maximum possible parcel size, but that when a threadlet moves (under threadlet control), only the original size of the threadlet makes up the new parcel.

In any architectural design, there is a delicate trade-off between the minimal capabilities needed to be useful, versus "feature creep" that enhances the capabilities of the overall systems, but at some expense (especially for common operations). The architecture described below is "at the small end" of the spectrum.

A memory macro in a PIGLET-0 system node is assumed to have the following properties: 1. A memory macro is a physically contiguous set of addressable locations, with a wide word of about 256 bits being the minimum unit of read access when the memory is physically accessed. A full word access (the number of bits read into internal sense amps by a single access) is nominally 2048 bits. Typical sizes for a memory macro would be in the 2 MB to 32 MB range, although there is nothing to prevent other sizes. 2. The electrical inputs to the memory macro include a write-enable line on each bit. Thus, by performing a read of a full word into the memory macro's sense amps before writing data back to it, it is possible to do selective bit updates by providing a mask along with the write data. 3. There may be additional flag bits (number is implementation dependent) associated with some standard unit of storage (also implementation dependent) that may be manipulated independently of the memory words themselves. 4. The physical storage is divided into contiguous (but not necessarily same size) pages, each of which may be mapped into one (or more) virtual address spaces. Contiguous pages on a physical node need not be contiguous virtually. 5. An Address Space Identifier (ASID) associated with each such page identifies the name of the virtual address space to which this page belongs. It is possible that the same page maps to several virtual address spaces simultaneously. 6. Also associated with each page is the origin in the virtual space that the page origin maps, the extent of the region covered by the page, and an interleave factor that determines which slices of the virtual space are actually covered by the physical page. The interleave factor may be in units of a memory full word width. If the factor is other than 1, then the physical length of the page may be different from the extent of the page's image in virtual space. 7. Also associated with each page is a Lock code and an Access Rights field that together provide protection information. In order for a PIGLET access to a page to go through without hitch, the access must provide a key code that satisfies the lock code (implementation dependent), and the type of access match the types allowed by the Access Rights. Access rights variations include whether or not writes, spawns of new threads, or reads of full address descriptors are permitted. 8. Standard object sizes stored in memory that are directly manipulatable by PIGLET-0 code are 64 bit double words (DW), 256 bit wide words (WW), and 2048 full words (FW). Memory management hardware associated with the memory macro may, when given a virtual address, determine if the specified address is mapped to within any pages contained by this macro, and to what location is a match mapped. Other logic can then use the lock code and access rights to determine if a particular access is to be permitted. However, no assumptions are made within PIGLET as to the size, location, or implementation of either the addressing information, the translation logic, or the makeup of the memory (DRAM, SRAM, ROM, etc.) There is also nothing that prevents a memory macro from actually being a cache structure for some other host processor. Finally, redundant copies for various common areas of application memory may be kept on multiple memory nodes. Such common areas may be tables of pointers, global constants, common code routines, etc. Thus when a threadlet travels to a particular node because of the presence of some unique data at that node, then referencing one of these common areas will cause neither a fault, or a need to move the threadlet. The threadlet will simply be given access to the local copy.

Figure 2:
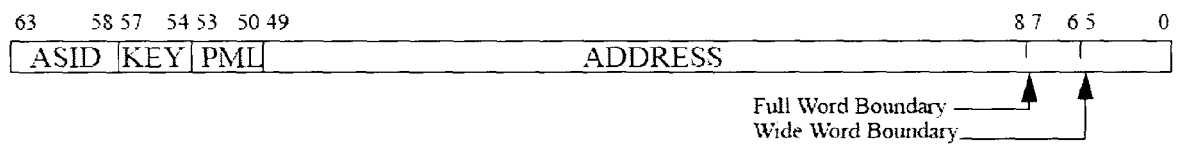
FIG. 2 illustrates a preferred embodiment for a 64 bit address descriptor of the present invention.

Since PIGLET may be used with extremely large systems, a preferred default size of a memory name (termed an Address Descriptor) is 64 bits, as shown in FIG. 2. However, since $10^{19}$ bytes is a bit more than is likely to be seen in the next decade in terms of deployed memory, not all of the 64 bits of a descriptor may be "address bits." In fact the 64 bit address descriptor typically has several subfields (notional values for each subfield are included in parentheses): 1 ASID: address space identifier (6 bits) that indicates to which of several "virtual" address spaces the rest of the address relates (an ASID of 0 may correspond to the physical name of storage, if there is such a thing). 2. KEY (4 bits): a protection code that is presented to the memory management unit of a memory macro supposedly containing the specified address. This code should give the rights to which this threadlet is permitted when accessing memory. 3. PML: Permitted Modification Length (4 bits): is an indicator of how many bits of the address may be changed by PIGLET operations. This permits a program to restrict threadlets to operate only within some block of its full address space. How the code points within this field map into different ranges of bits in an address is implementation dependent at this point. 4. ADR: Address specifier (50 bits): is the actual address of a byte in memory, where some object begins. Even though this is a byte significant address, it may be assumed for the most part that this is an aligned double word address. 50 bits corresponds to a petabyte.

When an address is used to move a threadlet to a new memory macro, the ASID and the ADR fields are the only ones that the translation and routing logic will use in the process. Modification of an ADR (such as by an increment) will be allowed only as long as no bits outside those permitted by the PML field are changed. Changes outside that region will be flagged as an error condition. No modifications of the PML, KEY, or ASID fields will be permitted via PIGLET computations. Loading of an address from memory may be depend on the access rights associated with the addressed region, as specified by the KEY fields and information stored with the page being addressed. If the rights indicate that a full address descriptor can be loaded, then changes in any field are permitted. Otherwise, only the PML and ADR fields may be changed, and only if the ASID is the same as that already active. Copying of an address descriptor from another threadlet register is permitted, but only if the ASIDs match. As before, only the PML and ADR may be changed. On normal memory data accesses, the ASID and ADR need to agree with what the local memory macro believes that it contains, and the KEY field (if implemented) must be such as to permit the kind of access recorded in the memory macro's memory management unit as acceptable for that region of storage.

A threadlet is the combined code, working registers, and program state that represents a basic unit of execution in a PIGLET architecture. At any point in time a threadlet may be in one of only three states: 1. resident in hardware associated with some memory macro, 2. awaiting execution or actively under execution, suspended and stored in a parcel while being transported from one memory macro to another, 3. suspended and stored in a memory. In all cases, all information needed to perform the designated computations (including the code) is packaged in the threadlet, except for any memory that might be referenced, or translation information that may indicate where physically memory that might be accessed by the threadlet may be located.

Other than changes in memory contents or memory location, the execution of a threadlet is referentially transparent," that is, the threadlet will always perform the same regardless of when or where it is executed. There may be any number of threadlets stored, in transit, or in execution within a system (or any node in the system) at any one time. There is no constraint on the contents of a threadlet—multiple concurrent threadlets may have identical information. For the purposes of the present invention, threadlets are anonymous; there is no unique information to distinguish one from another, or to identify the same thread at different points in time. The format used for a threadlet stored in memory is identical to that used for its transmission in a parcel. Threadlets may come in a variety of sizes, including at least 256, 512, and 2304 bits.

A threadlet may be built and set in execution by another threadlet, or by some other host processor. A parcel (PArallel Communication ELement) is the packet of information that contains all the information needed to execute a threadlet. A parcel is typically generated when a threadlet, while in execution, signals that it wishes to change its site of execution to that associated with some particular memory location. Such a signal causes the threadlet to be suspended, all information packaged into the parcel, and given to a communication system for routing to the desired node. When the parcel arrives at the destination node, the parcel is unpacked and the suspended parcel restarted. The key (and only) information provided by a threadlet when it wishes to transport itself is the address of some memory location believed to be part of the current application. This address is used to decide by the router as to where to ship the parcel, and is used by the threadlet when it is unpacked to verify that it is in the correct place. A parcel may contain additional information not part of the threadlet, but which may be of use to the underlying system in efficiently performing its operations. One example of such information may be error correcting codes. Another example of such information may be routing information that may provide hints to the receiving node as to who and where the sending node was, or where the parcel has been in the recent past. The information contained by the parcel that is not part of the threadlet vary from system to system, but should have no effect on the correct operation of an individual threadlet (it may, however, affect timing).

The actual nature of the routing of a parcel may be any combination of hardware or software that a system designer so desires. It is also permissible that the routing may not be guaranteed accurate: when a threadlet reawakens, it will resume in a way that verifies that it is at the correct node. If it is not, it will once again suspend itself and fold into a parcel. Thus the present invention envisions employing a routing system that relies on successive refinements in routing, with absolutely no impact on the correctness of the ultimate threadlet execution. This is to allow for a variety of routing schemes, from a simple "always route parcels to a directory node" to keeping an extensive "TLB" on a node which is highly, but not 100%, accurate.

In keeping with the desire for absolute simplicity and a recognition that threadlet programs will largely be ones that traverse through memory on the basis of embedded addresses, there are only a few types of registers in a PIGLET-0 implementation, several of which have specific purposes. The number and makeup of these registers may vary depending on the format of the threadlet. However, the following are preferably present in a threadlet state (which fits into a minimum sized parcel of 256 bits (see the first line of FIG. 3): 1. An Address Register (denoted the A register): a register that contains a 64 bit address descriptor (see FIG. 2) which nominally points to the object in memory currently of interest to the threadlet. This register is also the register used by the threadlet to indicate to where it wishes to move when a change of execution site is appropriate. Thus it is also the register that the underlying routing hardware will use to predict how to route a parcel when so ordered. 2. A Data Register (denoted the D register): a 64 bit register that is used as the main interface between a threadlet and the memory macro to which it is currently attached. In a real sense it acts as an accumulator register for a PIGLET-0 program. Under certain instructions, D is actually assumed to consist of two subfields: a 50 bit lower field termed the Count/Index (CI) field, and a 14 bit higher field termed the Register Indirect field (RI). The CI field is often used as either a transfer count or an address increment, while the RI field is used as an index into U, at either the byte level or the double word level. These selections also match the partitioning present in address descriptors (see FIG. 2). 3. An Argument Register (denoted the R register): a 64 bit register that may contain additional working information used by the threadlet in its processing. 4. A Format Register (denoted the F register): a 2 bit register that indicates the size of this threadlet or parcel (1, 2, or 9 wide words). When a parcel is retrieved from memory, this register may also contain a code indicating that the parcel is NOT in a PIGLET format, and as such may be a thread descriptor for a thread in whatever other ISA is native to the current node. 5. A Status Register (denoted the S register): a 5 bit register that records any exceptional conditions that the threadlet may have encountered. 6. A Program Counter (denoted the PC register): a 9 bit register that indicates where within the C register the next PIGLET-0 instruction is to be found. This register points to storage in increments of 4 bits. 7. A Code Space (denoted the C register): a register made up of all or part of the rest of the threadlet that contains the program to be executed. It is assumed to be a multiple of 4 bits (each of which will be called a digit), and is indexed by the PC. For a minimal parcel of 256 bits, C is thus 48 bits (12 digits). The digits of C are subscripted as C[4], C[5], . . . up to a maximum of C[511]. There is no C[0] through C[3].

Threadlets of the present invention may be longer than 256 bits, with preferred lengths of 512 bits or 2304 bits. A threadlet having a length of 512 bits appends an extra wide word; a threadlet having a length of 2304 bits appends a complete memory full word. In either case, these extended lengths introduce additional PIGLET-0 program visible resources: 1. Expanded code space, i.e. the C register may grow into the new storage in a contiguous fashion. 2. Wide Word Registers (denoted W[0] through W[7]), each of which is 256 bits in length. 3. Extra Registers (denoted E[0] through E[31]), each of which is 64 bits in length. 4. Full Word Register (denoted as the U register) which is 2048 bits long. When the threadlet is only 512 bits long, only W[0] and E[0] through E[3] are accessible. The rest are accessible only for full length threadlets. The E registers are aliases for parts of the W registers (E[0] through E[3] make up W[0], etc.), and the W registers are aliases for parts of the U register. In either case the C register is assumed to overlap the W, E, and U registers, starting at the lower end, and may extend to any arbitrary point in the registers. Modifying registers which overlap code space causes indeterminate execution results. The C register does not extend into E[31].

Addressing of a register that does not exist in the current format causes a program exception. This includes C[0] through C[3], or any C digit that does not exist in a particular format. FIG. 3 diagrams the suggested placement of these registers within a parcel.

A new instruction is executed each time a threadlet is either awoken from a parcel or when it has completed a prior instruction. The instruction executed comes from the C register by using the current value of the threadlet's PC as a digit index. A value of PC of 3 or less, or greater than the size of the current threadlet length (as determined by the F register) causes a program exception. The instruction executed may be some multiple of consecutive digits, and unless the instruction deliberately changes the PC, the PC at the end of the instruction's execution will point to the digit immediately following the last digit of the instruction. Nothing in PIGLET-0 specifies what the initial value in PC must be the first time a threadlet starts execution, although typically it would be expected to be 4. The thread that built the initial threadlet values in the first place is responsible for initializing this value. When a PIGLET-0 program terminates via a QUIT, all information associated with the threadlet is assumed destroyed, and any memory reservations or bus locks are released. When a PIGLET-0 program terminates by a program exception, the PC is assumed left pointing to the beginning digit of the instruction that caused the problem. Also, any memory reservations or bus locks are released. From a programmer's perspective, PIGLET-0 programs are logically executed one instruction at a time. In particular, this implies that all results from one operation are reflected back in threadlet registers before the next instruction references them. This includes actions against local memory. Thus a Load following a store will see a memory that has the results of the store reflected in it. Other than these dependencies, there is nothing that prevents a pipelined implementation of a PIGLET-0 processor, with multiple instructions from a single threadlet at different stages of execution at the same time.

Despite the atomicity of the instruction sequence executed from a single threadlet, there are absolutely no constraints on the interleaving of operations, especially memory references, from different threadlets (or threads running in a different ISA against the same memory node). This allows for various forms of simultaneous multi-threading to be in play at the same node at the same time. In cases where memory dependencies are important, such as in complex atomic memory references, special PIGLET-0 instructions will denote the extent during a threadlet execution where special considerations for interleaved executions need to be put in play.

A typical PIGLET-0 threadlet will not have the code space to maintain an exception handler. Consequently, in the PIGLET-0 architecture, when a condition has arisen that is beyond the capability of normal instructions to handle, the threadlet's execution is stopped, a code inserted in the S register, and an interrupt or signal raised to whatever other processor is associated with the current memory node where the threadlet is residing. It is up to this other processor to handle the problem. In most cases, the PC within the threadlet state points to the beginning of the instruction in execution at the time the threadlet was stopped. The semantics of whether or not the threadlet can be restarted, or how the hardware resources associated with the threadlet are freed up, is not part of the PIGLET-0 architecture. The following list summarizes the potential exception codes that might be found in the S register. Actual value assignments are left to the first hardware implementation.

Transmission errors associated with a parcel: T1: this parcel arrived with bad parity or ECC, and T2: the hardware routing functions are unable to forward this parcel to any other node.

Memory addressing errors during the execution of a threadlet instruction: A1: bad parity or ECC on a requested location, A2: improper access to a valid location, A3: presentation of an address that does not exist on this node, and A4: an address was presented that was not properly aligned.

Computational errors: C1: arithmetic exception on an arithmetic operation (there may be a long list of these depending on local computational resources), C2: attempt to change the ASID or key in the A register in ways that are not currently permitted, and C3: attempt to modify parts of the ADR field in the A register that are outside the scope of that allowed by the PML field.

ISA interpretation errors: I1: undefined opcodes, I2: operations not supported by the current hardware processor, I3: referencing a register not present in the current parcel, and I4: branching outside of the current parcel limits.

Other: O1: error conditions signaled directly by an explicit threadlet instruction (one of the BC combinations), and O2: after some implementation-dependent number of unsuccessful tries at spawning a new threadlet.

A preliminary ISA that may be used for PIGLET-0 will now be described. Each instruction is constructed of one or more 4 bit digits which are found in contiguous locations in the C register fields of the parcel. FIG. 4 gives the instruction formats assumed, While Table 1 below lists for each opcode its format, registers referenced and modified, exceptional conditions that it might raise (in terms of the numbering of conditions assigned as described above), and the semantics of the instruction.

TABLE 1

PIGLET-0 Instruction Set Architecture Summary

| Instruction | Opcode | Format | Registers Referenced | Registers Modified | Exceptions Potentially Raised |
|---|---|---|---|---|---|
| QUIT | 0000 | 1A | none | None | none |
| | The execution of this threadlet is halted, and all resources associated with it are freed. If memory has been locked or reserved, the lock is released. | | | | |
| MOVE | 0001 | 1A | A | None | T1, T2 |
| | Check to see if the memory node holding the address in the A register is the currently local one. If so, continue execution with the next instruction. If not, suspend the execution, leaving the PC pointing to the current MOVE instruction, package the threadlet into a parcel, and dispatch the parcel to whatever the local node routing hardware believes to be the node that contains the address descriptor present in A. When the parcel arrives at that node, the threadlet is restarted at the MOVE, allowing the local memory management hardware to verify that the parcel is in fact at the correct node. If the answer is no, the process repeats itself, with the threadlet suspending and local routing hardware making another choice. When execution finally moves beyond the MOVE, the threadlet is guaranteed that the location associated with the address descriptor in A is in fact in the local memory. If memory has been locked before the MOVE, the lock is released before the MOVE is moved. | | | | |
| LOAD | 0100 | 1A | A | D | A1, A2, A3 |
| | Register D is loaded from the local memory with the 64 bit word pointed to by A. Lower 3 bits of A ignored. If this operation is to a location reserved by this or another thread, release that reservation. | | | | |

TABLE 1-continued

PIGLET-0 Instruction Set Architecture Summary

| Instruction | Opcode | Format | Registers Referenced | Registers Modified | Exceptions Potentially Raised |
|---|---|---|---|---|---|
| STORE | 0101 | 1A | A,D | None | A2, A3 |
| | Copy the 64 bit quantity in register D to the 64 bit location specified by A in the local memory. Lower 3 bits of A ignored. If this operation is to a location reserved by this or another thread, release that reservation. | | | | |
| LOCKA: Load & Lock A | 0110 | 1A | A | D | A1, A2, A3 |
| | Use the descriptor in A to read a 43 bit quantity, and place in D. Also place a lock (or reservation depending on implementation) on the specified address in A before loading the contents. If there was a pending lock by this threadlet, release that lock and replace it by this one. | | | | |
| RELA d: Store and release d | 0111 | 2C | A, D | None | A2, A3 |
| | If there is still a lock (or reservation) on the address specified by A, then store D into memory, and clear the lock (reservation). if there is no longer a reservation or lock (not possible if the implementation was via a bus lock), then do not perform the specified store, and instead use the 2nd digit d as a relative displacement to be added to the PC, forcing a branch. | | | | |
| INC r, d | 0010 | 2A | A or D | A or D | C3 when incrementing A |
| | Increment the specified register r = {A, D} by a value of d = +− {1, 8, 32, 256} | | | | |
| OP fcn | 0011 | 2B | D, R | D | I1, I2 |
| | Perform operation designated by the second digit on the contents of D and R, and place the results back in D. This includes both fixed point, logical, shift, and floating point operations. | | | | |
| SWAPDA | 1000 | 1A | D | A | C2 |
| | Swap D and A, but only modify A if ASID and KEY match. | | | | |
| SWAPAR | 1001 | 1A | R | A | C2 |
| | Swap D and A, but only modify A if ASID and KEY match. | | | | |
| SWAPDR | 1010 | 1A | R, D | D, R | none |
| | Swap the values in registers D and R. | | | | |
| BC T/F, cond, d | 1110 | 3B | any | depends | |
| | Perform a conditional test, and branch if the specified condition matches the T/F bit by adding the displacement d to PC. The 8 conditions are: D = 0, D < 0, CI field of D = 0, CI field of D < 0, The address descriptor in A is to a local address Special: if T/F flag is true, then unconditionally branch, else suspend this threadlet and use d as an interrupt code to the current node's native processor. | | | | |
| . . . | | | | | |
| XMEM | 1111 | 3A or 4A | any | Any | Loads: A1, A2, A3, C2, I3 Stores: A2, A3, I3 |
| | Extended memory operation, all use the address descriptor in A as address, with 3 possible functions in 3 byte format (& 6 bit specifier to denote *register to be used in the transfer, and a variety of transfer options), and one function (Store & release) in a 4 byte format: Load specified register Store specified register Load and lock specified register: place a lock (or reservation) on the specified address in A before loading the contents. If there was a pending lock by this threadlet, release that lock and replace it by this one. Store specified register and release: if there is still a lock (or reservation) on the address specified by A, then store the specified register into memory, and clear the lock (reservation), if there is no longer a reservation or lock (not possible if the implementation was via a bus lock), then do | | | | |

TABLE 1-continued

PIGLET-0 Instruction Set Architecture Summary

| Instruction | Opcode | Format | Registers Referenced | Registers Modified | Exceptions Potentially Raised |
|---|---|---|---|---|---|
| | | | not perform the specified store, and instead use the 4th digit as a relative displacement to be added to the PC, forcing a branch. | | |
| SPAWN L1,L2 | 1101 | 3B | all | none | O2 |
| | | | Spawn a new threadlet on the current node, identical in every way to the current one, except that the PC is set to L1 (or if L1 < 4, then use L1 + 16). If the current node's hardware is incapable of spawning a new threadlet at the current time, add L2 to the PC. | | |
| SPECIAL 1 | 1011 | 2B | depends | depends | depends |
| | | | Perform the special function specified by the second digit. | | |
| SPECIAL 2 | 1100 | 3B | depends | depends | depends |
| | | | Perform the special function specified by the second digit, with the third digit as an operand specifier. | | |

Loads that specify a "lock" may be implemented in a variety of ways as described above, either as a local memory macro bus lock, a lock on the specified address, or a simpler "reservation" on that address (or the wide, full word, or page in which it is contained, depending on implementation), which is released if any operation attempts to modify that are of memory. The Release performs a store only if the lock/reservation is still in place, and branches if the store fails. In cases where there is a guaranteed bus lock, such a branch would never be taken. However, the mechanism is included here to allow for either implementation.

The Special1 opcode uses the second digit to specify one of several possible low occurrence, but useful operations, as specified in Table 2 below.

TABLE 2

Special1 Opcode Summary

| Opcode | Second Digit | Format | Registers Referenced | Registers Modified | Exceptions Potentially Raised |
|---|---|---|---|---|---|
| LRI | 0000 | 2B | R, W | R | 13 |
| | | | Load R from a copy of E[RI], i.e. indirectly through the top of R. | | |
| SRI | 0001 | 2B | R, W | W | 13 |
| | | | Copy R to E[RI], i.e. indirectly through the top of R. | | |
| LRII | 0010 | 2B | R, W | R | 13 |
| | | | Same as LRI but also increment the RI field of D. | | |
| SRII | 0011 | 2B | R, W | W | 13 |
| | | | Same as SRI but also increment the RI field of D. | | |
| Suspend | 0100 | 2B | A | None | A1, A2, A3, A4, |
| | | | The current threadlet is to be suspended by storing it away in memory, starting at the wide word specified by A. The PC in the suspended thread points to the next digit in C. | | |
| CPS Change Parcel Size | 10XX | 2B | none | F | 12, 14 |
| | | | Change the size of the threadlet to 1,2, or 9 wide words. The new PC must fit within the new constraint, or an exception will be raised. | | |
| RELEASE | 1100 | 2B | A | None | A1, A2, A3, A4, |
| | | | Release current lock/reservation without a store | | |

The Special2 opcode uses the second digit to specify one of several possible low occurrence, but useful operations, as specified in Table 3 below, with the third digit used as another operand specifier.

TABLE 3

Special2 Opcode Summary

| Opcode | Second Digit | Format | Registers Referenced | Registers Modified | Exceptions Potentially Raised |
|---|---|---|---|---|---|
| Launch | 0000 | 3B | A | None | A1, A2, A3, A4, O2 |
| | | | A must point to a wide word aligned location. If so, start the thread whose state is contained in that wide word as a thread separate from this one. The F field of that wide word determines if this new thread is a PIGLET threadlet or a native thread descriptor. In either case, if the hardware of the current node is incapable of starting the new thread, the branch specified in the third digit is taken, as with the spawn. | | |
| LQUIT "Launch & Quit" | 0001 | 3B | A | None | A1, A2, A3, A4, O2 |
| | | | Same as Launch, but the hardware can assume that the current threadlet will be quitting, and thus the resources currently associated with the current threadlet can be released, perhaps for the new thread if that is a PIGLET threadlet. | | |
| Copy_state | 0010 | 3B | A | None | A1, A2, A3, A4, |
| | | | The current threadlets copied into memory, starting at the specified wide word just as with Suspend. The PC in the copied state points to the next available digit in C. The current threadlet, however, is not suspended, and instead continues execution at the digit indicated by adding the third digit value of this instruction to the PC. | | |
| tbd | 0011 | | | | |
| LR | 010X | 3B | W, R | R | 13 |
| | | | Load R from the E register selected by the last 5 bits of this instruction | | |
| SR | 011X | 3B | W, R | W | 13 |
| | | | Copy R into the E register selected by the last 5 bits of this instruction | | |
| IRI_high | 1000 | 3B | D | D | none |
| | | | Copy the 3rd digit into D[57:54] - part of the RI field. | | |
| IRI-low | 1001 | 3B | D | D | none |
| | | | Copy the 3rd digit into D[53:50], and zero out the rest of the RI field of D. | | |

Figure 5:
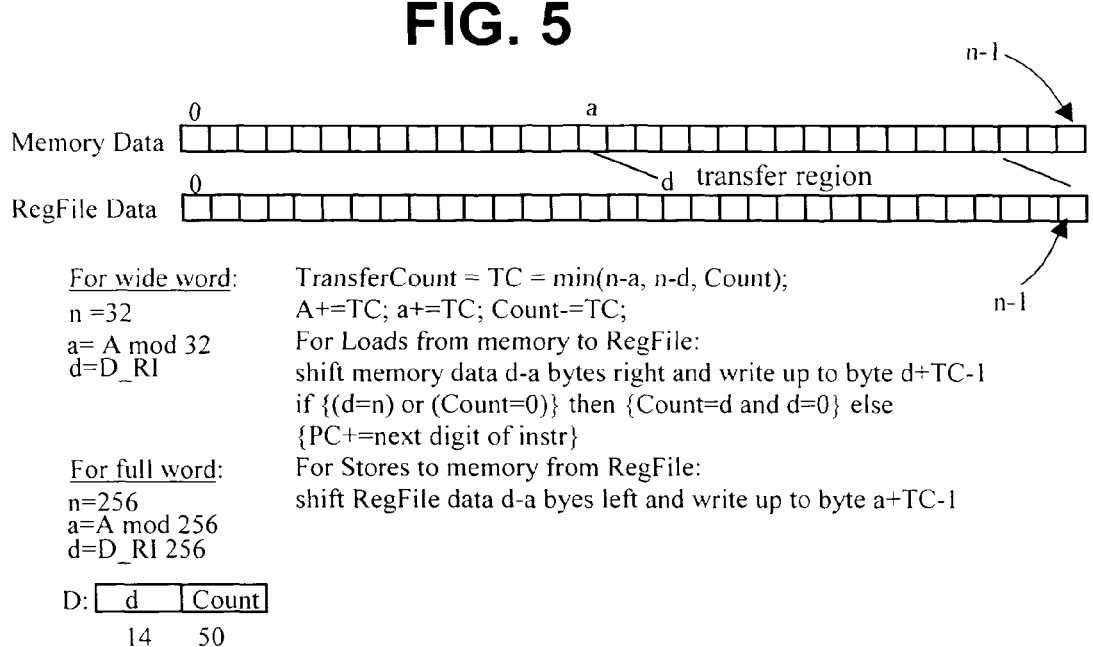
FIG. 5 illustrates in schematic form the side effects of XMEM during packed transfers in a preferred embodiment of the present invention.

The XMEM instruction includes 6 bits to specify one of 64 different registers, along with some specific options to be used when making the access, including: 1. The size of the transfer that occurs, 2. Whether or not the address in the A register is "auto-aligned," i.e. any low order bits that would shift the address off of a natural boundary are ignored, 3. Whether or not the R register is used for a mask in performing the operation, i.e. each bit in R controls whether or not some corresponding bit(s) in the register (for loads), or in memory (for stores) is modified, and 4. Whether or not there are any special considerations, such as: a. Instead of accessing the data part of memory, the flag part (if implemented) is accessed, and b. A Packed Transfer, where there is a shifting of the data at the byte level in the process of transferring between a register and the memory macro. This shifting is governed by the low order bits of A and D, and has as a side-effect the modification of both A and D, as illustrated in FIG. 5, with D assumed to have two independent fields: a transfer count in the low 50 bits, and a pointer into U in the high 14 bits. Such an operation is included to support packed transfers of data as in DMA operations. Table 4 below describes this computation.

TABLE 4

Register Specifier and Access Options for XMEM Instruction

| Specifier Codes | Register | Transfer Size | Auto Align | Mask | Comments |
|---|---|---|---|---|---|
| 0–31 | E[0] ... E[31] | 64 b | Yes | No | |
| 31–39 | W[0] ... W[7] | 256 b | Yes | No | A simple wide word transfer |
| 40 | R | 64 b | Yes | No | |
| 41 | D | 64 b | Yes | No | Access flags associated with addressed DW |
| 42 | D | 64 b | Yes | No | Access flags associated with addressed WW |
| 43 | D | 64 b | Yes | No | Access flags associated with addressed FW |
| 44 | U | 2048 b | Yes | No | A simple full word transfer |
| 45 | W[0] | variable | No | No | A Packed transfer governed by low bits of A & D |
| 46 | W[7] | variable | No | No | A Packed transfer governed by low bits of A & D |
| 47 | U | variable | No | No | A Packed transfer governed by low bits of A & D |
| 48–55 | W[0] ... W[7] | 256 b | Yes | Yes | 1 bit from R controls write-enable for 4 bits of W |
| 56 | R | 64 b | Yes | Yes | |
| 57 | D | 64 b | Yes | Yes | Access flags associated with addressed DW, 1-1 bit mask |
| 58 | D | 64 b | Yes | Yes | Access flags associated with addressed WW, 1-1 bit mask |
| 59 | D | 64 b | Yes | Yes | Access flags associated with addressed FW, 1-1 bit mask |
| 60 | U | 2048 b | Yes | Yes | 1 bit of R masks 1 byte of U |
| 61 | E[D[54...50]] | 64 b | Yes | No | The E register addressed by the top part of D |
| 62 | U[D[57...50]] | 8 b | Yes | No | The byte in U addressed by the top part of D |
| 63 | | | Yes | Yes | |

Figure 6:
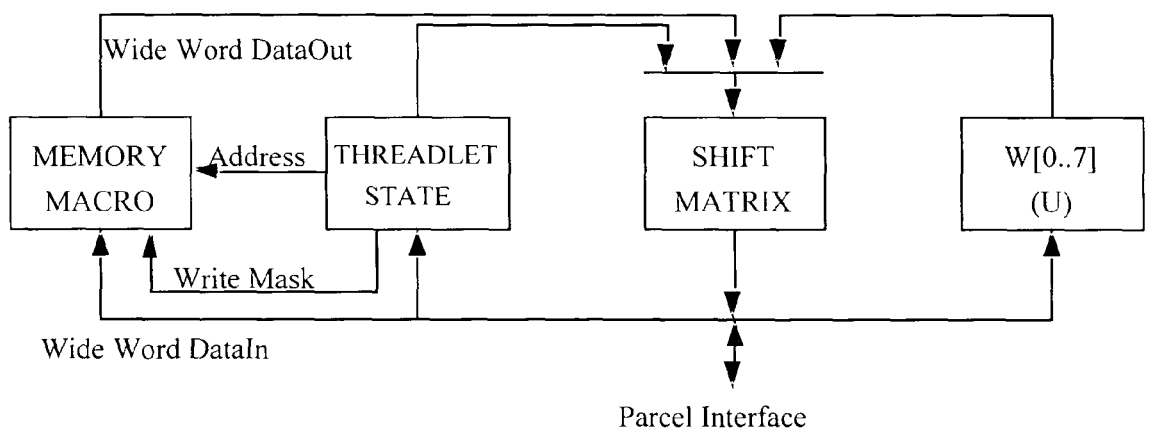
FIG. 6 is a schematic diagram of a notional microarchitecture of a preferred embodiment of the present invention.

FIG. 6 is a schematic diagram of a notional microarchitecture termed BACON (Basic microArchitecture for Computation On Nodes). The architecture shown allows for simple implementation at relatively high speed, with little control complexity and little dataflow logic.

In FIG. 6 A parcel arrives at the Parcel Interface and is latched into the Threadlet State block and (if the parcel is larger than a minimum sized one) into the appropriate number of W registers. A Shift Matrix controlled by the Threadlet State block can combine date from the threadlet's state registers with data from either the W registers or the wide word output of the local memory macro, Logic within the Thread State block (described below) executes the PIGLET program. As it generates addresses for the local memory macro, the addresses are presented directly to the memory macro, along with the operation to be performed. If that operation is a write of some sort, the data to be written is generated by the SHIFT MATRIX Block and presented to the local memory macro. If that operation is a read of some sort, a wide word is read out of the memory macro, combined as appropriate with data from the threadlet's registers or payload W registers, and stored back in the appropriate destinations. When a new parcel is to be generated, information from the threadlet state, the memory macro, and the W registers may be combined and presented to the parcel interface for transmission.

Figure 7:
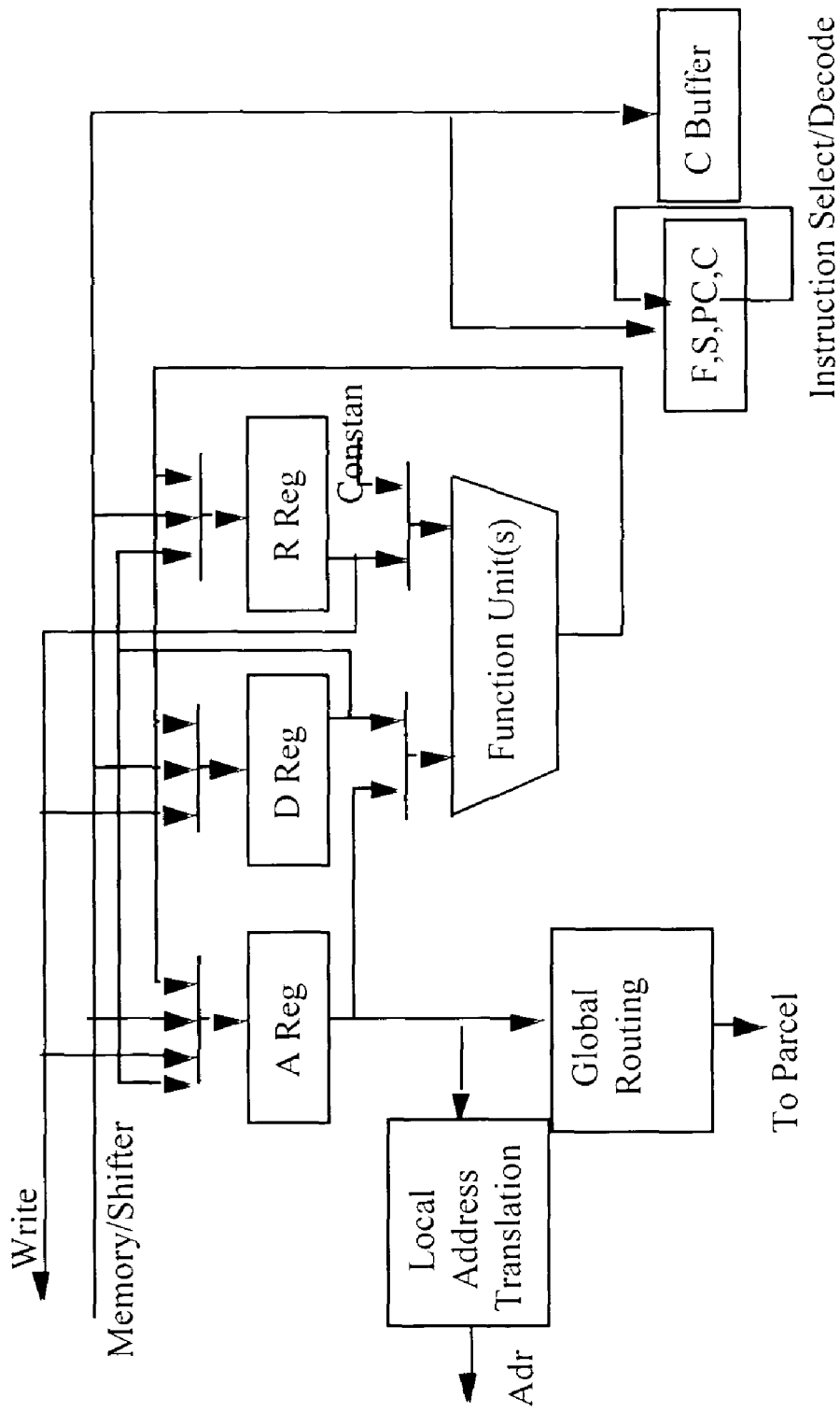
FIG. 7 is a schematic diagram of the processing logic for the threadlet state of a threadlet of a preferred embodiment of the present invention.

The processing logic for the Threadlet State, see FIG. 7, is preferably based around a 256 bit register holding the 3 main PIGLET registers A, D, and R, plus the status, PC, and basic C register. Also assumed here is a second 64 bit register for prefetching the part of C that does not lie in the first wide word, but in some part of W.

In FIG. 7 the PC register specifies 4 bits out of C or the C buffer that represents all or the start of a new instruction. These bits are decoded (and additional 4 bits fetched as needed) and the instruction executed. For non-memory access instructions, this involves routing the appropriate state registers to the appropriate function units, performing the operations, and returning the results to registers. The range of implementation approaches for such operations includes any of those used in modern computers, from simple multi-cycle control, through pipelined executions, to even superscalar implementations. With multiple copies of the state registers, such data processing may even be done in some form of simultaneous multi-threading, such as done in PIM Lite.

For memory access instructions, the A register is assumed by PIGLET-0 to contain the target memory address. This address may be processed in one of two fashions. First, it may be tested to see if it represents an application memory location that is actually resident on the local memory, and if the answer is yes, exactly where in the physical memory macro this address translates to. Second, if the address is being used to trigger a parcel, the logic labeled Global Routing would be invoked to determine at least the first step in the routing process to get the parcel to the designated PIM node. Note that any of a variety of well-known translation mechanism such as TLBs (Translation Lookaside Buffers) may be used for either or both translation functions.

Table 5 below lists a variety of simple threadlets that may be of interest. For each threadlet is a brief description of what it does, its size (in wide words), the number of 64 bit arguments it needs, the number of instructions that make up the code, and the length of the code in digits. The timing values are how many moves, loads (of any kind), stores (of any kind), and total instructions are executed for a nominal sequence (i.e. no reservation failures or the like).

| | Format | | | | Timing | | | | |
|---|---|---|---|---|---|---|---|---|---|
| Threadlet Function | Parcel Size | # Args | # Instrs | Pgm Size | Moves | Loads | Stores | Total Instrs | Other |
| Store-no ack (A:dest_adr, D:data) | 1 | 2 | 3 | 3 | 1 | | 1 | 3 | |
| | Save the 64 bits in Reg D into the location specified by A. | | | | | | | | |
| | MOVE; STORE; QUIT | | | | | | | | |

-continued

| Threadlet Function | Format | | | | Timing | | | | |
|---|---|---|---|---|---|---|---|---|---|
| | Parcel Size | # Args | # Instrs | Pgm Size | Moves | Loads | Stores | Total Instrs | Other |
| Store with ack (A: dest_adr, D:data, R: response_adr) | 1 | 3 | 8 | 10 | 2 | 1 | 2 | 8 | |
| | | | | | | | | | |

Store with ack (A: dest_adr, D:data, R: response_adr)  1  3  8  10  2  1  2  8
Same as the Store, but after completion, atomically increment the location addressed by R
MOVE; STORE; SWAPRA; MOVE; L1: LOCKA; INC A, +1; RELA L1; QUIT Fetch DW (A:src_adr, R:dest_adr)  1  2  6  6  2  1  1  6
Move a 64 bit word from location addressed by A to location addressed by R.
MOVE; LOAD; SWAPRA; MOVE; STORE; QUIT Store WW(A:src_adr)  2  1  3  5  1    1  3
Store the wide word in the second half of the parcel in the designated wide word in memory.
MOVE; XMEM ST, W0; QUIT Transfer WW (A:src_adr, R: dest_adr)  2  2  6  10  2  1  1  6
Move a wide word from location addressed by A to location addressed by R.
MOVE; XMEM; LD, W0; SWAPRA; MOVE; XMEM ST, W0; QUIT Transfer FW (A:src_adr, R: dest_adr)  1/9  2  6  10  2  1  1  6
Move a wide word from location addressed by A to location addressed by R.
MOVE; XMEM LD, U; SWAPRA; MOVE; XMEM ST, U; QUIT Atomic op to Memory DW(A:src_adr, R:value)  1  2  5  7  1  1  1  5
Atomically modify location A, using value from R, with operation in the threadlet code
MOVE; L1: LOCKA; OP op; RELA L1; QUIT Concatenate(A:src_adr, R:other_adr)  2  2  10  16  n  n−1  1  4n + 2
Run through the list starting at A (known to be non zero), until a cdr field found with a zero in it, and then substitute (atomically) R.
Start PC = 5. L1: SWAPAD: INC A, +8; MOVE; L2: LOCKA; BC F, D = 0, L1; SWAPDR; RELA L3; QUIT; L3: SWAPDR; BC T, uncond, L2

Block Transfer(A:src_adr, D:byte_count, R:dest_adr)  9  3  17  30  n = 1 + D/256  n−1  n−1  17n + 3
Transfer the number of bytes in D from A to R, in chunks of 256 bytes
Start PC = 16; L3: MOVE; XMEM load, U_packed, L1; SWAPAR;
L2: MOVE; XMEM store, U_packed, L2; QUIT;
At digit 16: BC T, CI = 0, L5; L3: MOVE;
L4: SPAWN L1, L4; INC D, −256; INC A, +256; SWAPAR, INC A, +256; SWAPAR;
L5: BC F, CI < 0, L3; QUIT Indexed Load (E[7]:src_base, E[6]:dest_adr, E[5]:Index&count)  9  3  30  54  n <= 48  24  24  608
Transfer multiple values using src_base with up to 24 indices stored in E[8] through E[31] as source addresses, and moving the data to consecutive locations starting at dest_adr
LR 5; SR 4;
L1: SWAPDR; BC T, uncond, CI = 0, L2; LRI; INC D, −1; SWAPDR; SR 4; LR 7;
OP add; SWAPDA; MOVE; LOAD; LR 4; SWAPDR; SRII; BC T, uncond, L1;
L2: LR 6; SWAPAR; LR 5;
L3: SWAPDR; BC T, CI = 0, L4; INC D, −1; LRII; SWAPDR; MOVE; STORE; INC A, +8;
BC T, uncond, L3;
L4: QUIT P"Post Semaphore" (A:semaphore_adr)  2  1  15  22  1  3  2  8/14
Increment the semaphore pointed to by A. Check the queue at A + 8 for waiting threads, and start the topmost.
MOVE; L1: LOCKA; INC D, +1; RELA L1; INC A, +8;
L2: LOCKA; BC T, D = 0, L3; SWAPAD; LOAD; SWAPAR;
RELA L2; SWAPAR; LQUIT; L3: QUIT V "Wait on Semaphore" (A:semaphore_adr, E[6]:return_adr, E[7]:free_space_adr)  9  3  ~50  ~75  2  >=1  >=2  ~50
Decrement the semaphore. If non-negative, return response to sender. If negative, grab a block from the free space, save the current threadlet state, and link to the semaphore queue. Then go back and check atomically the semaphore; if it is positive, decrement it, return the storage to memory, and send a response to sender.
MOVE L1: LOCKA; INC A, −1; BC F, D < 0, L12; RELEASE % dec semaphore & branch if ok
L2: LR 7; SWAPAR; SR 5% get free space ptr & save semaphore adr in E5
L3: LOCKA; BC F, D = 0, L5; RELEASE; BC F, Ex, #; BC T, uncond, L3; % if no free block
L5: SWAPAD, SWAPDR, LOAD; SWAPAR; RELA L3; % free block, delink it
SWAPAR; COPY_STATE L6; % save current state into free space buffer & continue -continued

| Threadlet Function | Format | | | | Timing | | | | |
|---|---|---|---|---|---|---|---|---|---|
| | Parcel Size | # Args | # Instrs | Pgm Size | Moves | Loads | Stores | Total Instrs | Other |
| | % At this point, a block is being restarted. See if semaphore is free. <br> L6: LR 5; SWAPAR; L7: LOCKA; INC A, −1; BC F, D < 0; L10 <br> % Still locked, put stored self on semaphore queue <br> INC A, +8; L8: LOCKA; SWAPAR; STORE; SWAPAR; SWAPDR; RELA L8; QUIT <br> % semaphore available. Take it and free this space <br> L10: RELA L7; SWAPAR; LR 7; SWAPAR; <br> L11: LOCKA; SWAPAR; STORE; SWAPAR; SWAPDR; RELA L11; BC T, uncond, L13 <br> L12: RELA L1; L13: LR 6; SWAPAR, MOVE, . . . do whatever to signal; QUIT | | | | | | | | | |

The block transfer routine described above assumes that a number of bytes given in the D register are to be transferred from memory starting at the address descriptor in A, and to the address descriptor at R. Both A and R may be on arbitrary block boundaries, and the maximum count that can be transferred is $2^{50}$ bytes (i.e. all of memory). The routine demonstrates the relatively complex XMEM instruction, plus the spawning of multiple sub-threads. While there are multiple approaches that could be taken to such transfers, the one taken here is an attempt to (usually) minimize total bytes transferred on the interconnection network. To do this, the original parcel has code in it that spills over into the second wide word, and when executed, starts execution at the code at the beginning of the second wide word. After verifying that the count is not initially 0, it proceeds to move to the memory holding the starting address. At this point it spawns a new threadlet that has the current arguments and the code resident in the end of the first wide word. This new threadlet is responsible for transferring up to 256 bytes from A to R, and then dying. The first call to XMEM will pack the next 256 bytes from the source into the U register of the parcel, and then move to the destination, where the U register will be moved in its entirety to the destination, at which point the threadlet quits. After spawning a 256 byte transfer threadlet, the original threadlet decrements its count, and increments both A and R to point to the next block of 256 bytes, and loops back to start a new transfer, if the count has not gone to zero. Note that this threadlet moves to the start of each block, thus guaranteeing that the transfer threadlet should be starting at the correct memory. In any case, however, the routine works correctly regardless of where the boundaries of memory macros are. Note that additional code could be added to the main routine to return and notify some location when it has initiated the last transfer.

Yet another interesting variation of this routine involves using a doubly nested initiating threadlet, one that skips not by 256 bytes, but by some much larger unit, and initiating a secondary threadlet at each break to skip through as above 256 bytes at a time. The result could be a huge increase in actual internal bandwidth, because many, many nodes could be busy with threadlets at the same time.

The Indexed Load routine is an interesting example of how threadlets of the present invention may tremendously decrease network traffic. The original parcel is initially assumed loaded with a base address, destination address, a count of up to 24 indicating how many index values (in E registers 8 to 31) are in the parcel. Each index is independently added to the base, then a 64 bit value fetched and stored in the parcel in the same place as the index. This is repeated up to 24 times (the amount of space left in a parcel with 9 wide words). As long as neighboring indices point to doublewords in the same memory macro, the threadlet will stay resident (no interconnect bandwidth consumed). After all indices are loaded into the parcel, the parcel moves to the memory holding the destination, where the data is stored away in memory in consecutive locations. A great many optimizations can be made, including: 1. a nested scheme such as described above for block transfers, 2. two sets of indices, one for the load and one for the store, where the indices must be themselves fetched from memory arrays, and 3. a strided transfer, where different strides are used on both source and destination.

One of the more interesting optimizations is one that would minimize total network traffic. If the parcel included a bit mask that identified which entries in U were processed to date, when the parcel moves to a new node it can iterate through the indices, checking for entries that are local (using the BC test for a local address). Those addresses that are local get processed right away, and have their mask bit reset. Then the parcel moves to the next unprocessed address (now known to be non-local) and process all addresses that are local there. Only when all mask bits are reset does the parcel move to the destination. No fewer network transfers are possible.

Threadlets may also support semaphore semantics in a relatively direct way. It may be assumed that each semaphore has with it two 64 bit words (guaranteed to be in the same wide word). Both P and V threadlets will use the first doubleword as a counter and the second as a queue of pending threadlets. Also of importance to this mechanism (and others) is the assumption that each memory node that may support semaphores has a locally aliased copy of a page of application memory as discussed above. Within this page, some location has a pointer to a set of free space (within the page) that threadlets can use to suspend themselves without bothering the host processor (if any). At application initialization, this free space pointer has preferably been built to point to a series of buffers (of 9 wide words in size) that are initially free, linked to each other, and all physically located on the current node. When queued on such a list that the A register in the parcel is the first doubleword of storage, and points to the next queued entry. A P parcel has as an argument the address of the semaphore pair. When sent to the memory containing the semaphore, the P program will release the semaphore by accessing it and incrementing it atomically. It will then dequeue the first suspended threadlet on the semaphore's queue (if any), and transfer control to that threadlet.

In most cases this newly started threadlet will itself go back and try to grab the lock; if some other process had grabbed the lock in the meantime, the threadlet will resuspend itself. Also, because where the threadlet originated may be unknown, no assumptions are made about whether or not to return its storage to free space. That is also left to the reawakened threadlet.

A parcel of type V will try to grab the lock, and suspend itself until the lock is available. It has the same set of arguments as P, but is a bit more complex. It first atomically decrements the counter. If the result was non-negative, it returns to its sender (using whatever acknowledgement protocol is desired). If the result was negative, it atomically requests a block of storage from the free space pointer on the current node, and copies its own state into that node. It then checks the semaphore again, and if the semaphore is now free, it releases the storage and returns to sender. If it is still blocked, it atomically links the stored version onto the semaphore's queue, and quits. When this stored version awakens, by P, it will have been dequeued, and will then test the semaphore, etc. using the same code that it did just before suspending itself the first time.

The matching routines Produce and Consume (not shown here) implement the full/empty bit semantics similar to that found in the MTA. They assume that there is a flag bit associated with each 64 bit word so addressed that is 1 for "full," and 0 for "empty." Their implementation is much like that for the semaphore case, except they would manipulate flags not data. Also, variations exist as to what to do when the producer finds a word full.

The present invention allows significant amounts of programming to be placed within the information packets that usually carry memory access requests between CPUs and memory. The threadlets can work directly with embedded addresses, and "where" those addresses actually lie. A variety of mechanisms for responding to threadlets after an atomic memory operation are possible by separate programming. The processing of threadlets may be done with relatively simple logic at the memory interface (such as is made available by PIM technology). The use of threadlets may significantly reduce the latency required for many hitherto time-consuming memory-centric activities. The use of threadlets may also significantly reduce the total information needed to be carried by the interconnection network coupling classical CPUs and memory. The techniques of the present invention scale to systems with huge numbers of CPUs and memories and are uniquely compatible with distributed virtual memory management systems imposed on top of physical memory chips, allowing for massively parallel memory systems without any centralized memory management. The techniques of the present invention also work not only with "simple" memories, but memories with additional flag or tag bits, or even cache memories. In the techniques of the present invention an ISA that is cognizant of the site of where it is processing, and as an explicit part of its program, may decide to move the site of execution to be closer to some other memory location, and the ISA also supports multiple threadlets from these memory programs, permitting multiple, concurrent activities to be taking place.

Each of these threadlets is capable of spawning new threadlets, suspending its own execution, or starting other threadlets that have been suspended. The process of restarting suspended threads need not require that they be in the ISA of the parcel threadlets, but can be in the ISA of a more complex host processor tied to the memory node. In addition there is direct support for alternative execution models by simple reprogramming. This can include more sophisticated data structure processing routines than those described earlier.

In preferred embodiments of the present invention there may be provided methods for identifying "runaway" or "deadlocked" threadlets, and terminating them. Dynamic parcel size modification, threadlet driven cache and cache coherency systems, threadlet-level implementation of TCP/IP, techniques for inter memory space transfers and error detection protocols to match, I/O, included attached I/O devices, applications where data is "striped" across multiple PIM nodes, may also be provided in preferred embodiments of the present invention.

One approach to developing more advanced uses of threadlets is the following: 1. From a series of benchmarks, derive sequences that have high potential to remove significant overhead from conventional models of computation, 2. Via simulation or modeling, extract estimates of the frequency of such sequences, 3. Encode each such generic sequence into separate threadlets, plus characterize the code that such threadlets would replace in terms of number of instructions and number and types of memory accesses, 4. Develop bandwidth models from this data that characterize the totality of required data transfers, and compare to what they would replace, 5. Identify the pieces of source code that might have related to the threadlet's generation, and what the compilation hooks needed to identify, encode, and then initiate the threadlets, 6. Perform an information-theoretic study to see if the frequency of static usage of each instruction type, times its length, matches a Huffman-like lower bound, and if there is a significant difference, look to remap the instruction set to achieve denser programs. 7. Look for additional functionalities that would either shorten currently-defined sequences into shorter parcel sizes, or enable the identification of additional threadlets 8. Perform a detailed timing analysis to develop a real sense of time spent at individual nodes, and how utilized various PIGLET functional units might be.

It should also be understood by those versed in the art that it is not necessary for all threadlet code to be stored within the parcel as described in the preferred embodiment, only that the parcel contain the threadlet's program counter at a minimum. If the threadlet programs are stored in the memory of each node at predetermined locations, then upon arrival of a parcel at a memory, its instruction fetch would proceed from the local memory, and not the parcel. Variations may include combinations of the techniques, perhaps with instruction caches added to each node, to allow for dynamic transfer of threadlet code on an as needed basis from some common memory.

All documents, patents, journal articles and other materials cited in the present application are hereby incorporated by reference. Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A computer system comprising:
   at least one first node connected to at least one second node, wherein said at least one first node and said at least one second node have at least one first memory and at least one second memory, respectively;

a threadlet configured to cause a program to run in said computer system executed by said at least one first node when said at least one first memory is local to said threadlet; and a parcel for moving said threadlet from said at least one first memory to said at least one second memory to execute said threadlet by said at least one second node when said at least one second memory is local to said threadlet.

2. The computer system of claim 1, wherein said program requires access to a first memory location to run.

3. The computer system of claim 2, wherein said threadlet is capable of determining that whether or not said first memory location is local to said threadlet.

4. The computer system of claim 1, wherein said computer system is capable of saving said threadlet and a state of said threadlet in said parcel.

5. The computer system of claim 4, wherein said state includes a program counter that references said program.

6. The computer system of claim 5, wherein said computer system is capable of injecting said parcel into a communication network.

7. The computer system of claim 6, wherein said computer system is capable of determining that said parcel has reached said second node after being injected into said communication network.

8. The computer system of claim 7, wherein said computer system is capable of unpacking said state from said parcel and restarting said threadlet in said state when said threadlet reaches said second node.

9. The computer system of claim 2, wherein said computer system is capable of verifying that said first memory location is within said second node.

10. The computer system of claim 1, wherein said threadlet includes said program.

11. The computer system of claim 1, wherein said computer system includes a plurality of said first nodes and each first memory of each of said first nodes includes a copy of said program.

12. The computer system of claim 1, wherein said program comprising an additional threadlet for causing said program to run in said computer system executed by said at least one first node when said at least one first memory is local to said additional threadlet; and wherein said parcel moves said additional threadlet from said at least one first memory to said at least one second memory to execute said additional threadlet by said at least one second node when said at least one second memory is local to said additional threadlet.

13. The computer system of claim 1, wherein a minimum state of said threadlet is a wide word.

14. The computer system of claim 1, wherein said threadlet has an extended state of full word plus a wide word.

15. The computer system of claim 1, wherein said first node is on a PIM-enhanced memory chip.

16. The computer system of claim 1, wherein said at least one first node is a plurality of first nodes.

17. The computer system of claim 16, wherein each of said first nodes is on a PIM-enhanced memory chip.

18. The computer system of claim 16, wherein each of said first nodes is on a set of PIM-enhanced memory chips interconnected by a communication network.

19. A method comprising the steps of:
executing a program having a threadlet;
executing said threadlet by a first node when a target memory required to execute said program at said first node is local to said threadlet; and
moving said threadlet to a second node when said target memory required to execute said program at said second node is local to said threadlet.

20. The method of claim 19, wherein said first program requires access to a first memory location to run.

21. The method of claim 19, wherein said threadlet is capable of determining whether or not said target memory is local to said first threadlet.

22. The method of claim 19, further comprising saving said threadlet and a state of said threadlet in a parcel.

23. The method of claim 22, wherein said state includes a program counter that references said program.

24. The method of claim 22, further comprising injecting said parcel into a communication network.

25. The method of claim 24, wherein said computer system determines if said parcel has reached said second node after being injected into said communication network.

26. The method of claim 25, further unpacking said state from said parcel and restarting said threadlet in said state when said threadlet reaches said second node.

27. The method of claim 26, further comprising verifying that said target memory is within said second node.

28. The method of claim 19, wherein said threadlet includes said program.

29. The method of claim 19, wherein said computer system includes a plurality of said first nodes and each first memory of each of said first nodes includes a copy of said first program.

30. The method of claim 19, wherein said program comprises an additional threadlet.

31. The method of claim 19, wherein a minimum state of said threadlet is a wide word.

32. The method of claim 19, wherein said threadlet has an extended state of full word plus a wide word.

33. The method of claim 19, wherein said first node is on a PIM-enhanced memory chip.

34. The method of claim 19, wherein said at least one first node is a plurality of first nodes.

35. The method of claim 34, wherein each of said first nodes is on a PIM-enhanced memory chip.

36. The method of claim 34, wherein each of said first nodes is on a set of PIM-enhanced memory chips interconnected by a communication network.

37. The method of claim 19, further comprising suspending said threadlet at said second node when said threadlet determines that said threadlet is not the next operation for said program.

38. The method of claim 30, further comprising the steps of: executing said additional threadlet by said first node when said target memory required to execute said program at said first node is local to said additional threadlet; and moving said threadlet to said second node when said target memory required to execute said program at said second node is local to said additional threadlet.

* * * * *